United States Patent
Matsuda

(10) Patent No.: US 7,739,419 B2
(45) Date of Patent: Jun. 15, 2010

(54) DATA TRANSFER CONTROL DEVICE AND ELECTRONIC INSTRUMENT

(75) Inventor: Kuniaki Matsuda, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 12/153,523

(22) Filed: May 20, 2008

(65) Prior Publication Data
US 2008/0294801 A1 Nov. 27, 2008

(30) Foreign Application Priority Data
May 23, 2007 (JP) .............................. 2007-136152

(51) Int. Cl.
G06F 13/00 (2006.01)
G06F 13/38 (2006.01)
G06F 12/00 (2006.01)
G06F 3/00 (2006.01)
G06F 3/06 (2006.01)

(52) U.S. Cl. .............................. 710/5; 710/22; 710/23; 710/28; 710/29; 710/36; 710/59; 710/62; 710/63; 710/64; 710/72; 710/74; 710/100; 710/305; 710/306; 710/311; 710/315; 711/100; 711/111; 711/112; 711/114; 711/154

(58) Field of Classification Search .................. None
See application file for complete search history.

(56) References Cited

U.S. PATENT DOCUMENTS

| 7,058,748 | B1 * | 6/2006 | Jacobs et al. ................. 710/311 |
| 7,069,350 | B2 * | 6/2006 | Fujita et al. .................... 710/22 |
| 7,225,304 | B2 * | 5/2007 | Suzuki ........................ 711/154 |
| 2004/0158669 | A1 | 8/2004 | Weng et al. |
| 2004/0252672 | A1 | 12/2004 | Nemazie |
| 2004/0252716 | A1 | 12/2004 | Nemazie |
| 2005/0120150 | A1 * | 6/2005 | Lissel et al. .................... 710/33 |
| 2005/0186832 | A1 | 8/2005 | Nemazie |
| 2006/0069884 | A1 * | 3/2006 | Kim et al. .................... 711/154 |
| 2007/0005813 | A1 * | 1/2007 | Juang et al. .................... 710/1 |
| 2007/0016702 | A1 * | 1/2007 | Pione et al. .................. 710/62 |
| 2007/0174504 | A1 * | 7/2007 | Tseng et al. .................. 710/22 |
| 2007/0206732 | A1 * | 9/2007 | Ito et al. .................... 379/67.1 |
| 2007/0260756 | A1 * | 11/2007 | Tseng et al. .................... 710/5 |
| JP | | | A-2003-316716 11/2003 |

FOREIGN PATENT DOCUMENTS

JP A-2002-099502 4/2002

(Continued)

OTHER PUBLICATIONS

U.S. Appl. No. 12/068,180 in the name of Kuniaki Matsuda et al., filed Feb. 4, 2008.

*Primary Examiner*—Tanh Q Nguyen
(74) *Attorney, Agent, or Firm*—Oliff & Berridge, PLC

(57) ABSTRACT

A data transfer control device includes a PATA I/F connected to a PATA bus, an SATA I/F connected to an SATA bus, and a sequence controller that controls a transfer sequence. The PATA I/F includes a task file register (TFR). The sequence controller suspends transmission of a register FIS corresponding to an ATA packet command issued by a host to a device, and performs a dummy setting that causes the host to issue an ATAPI packet command using the TFR. The sequence controller transmits the register FIS corresponding to the ATA packet command to the device after the host has issued the ATAPI packet command.

15 Claims, 25 Drawing Sheets

FOREIGN PATENT DOCUMENTS

| | | |
|---|---|---|
| JP | A-2004-070909 | 3/2004 |
| JP | A-2004-145866 | 5/2004 |
| JP | A-2004-246853 | 9/2004 |
| JP | A-2005-327230 | 11/2005 |
| JP | A-2005-346123 | 12/2005 |
| JP | A-2006-018428 | 1/2006 |
| JP | A-2006-121621 | 5/2006 |
| WO | WO 2006/051583 A1 | 5/2006 |

* cited by examiner

FIG. 3A PIO READ
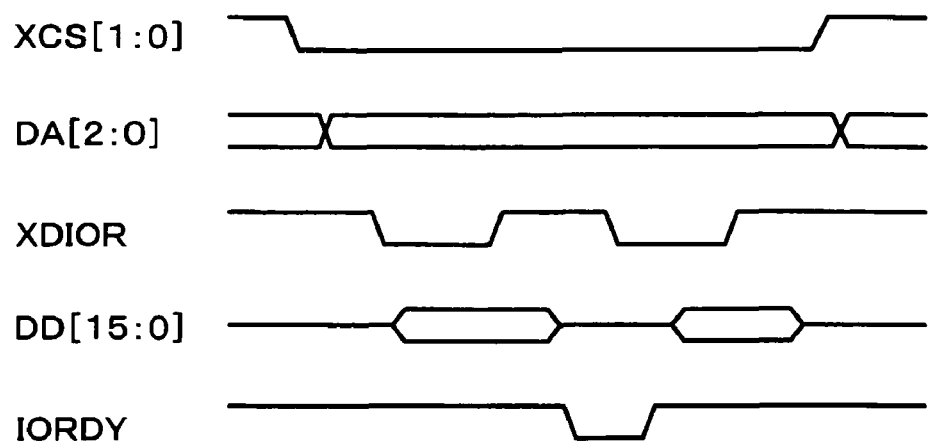
FIG. 3B PIO WRITE
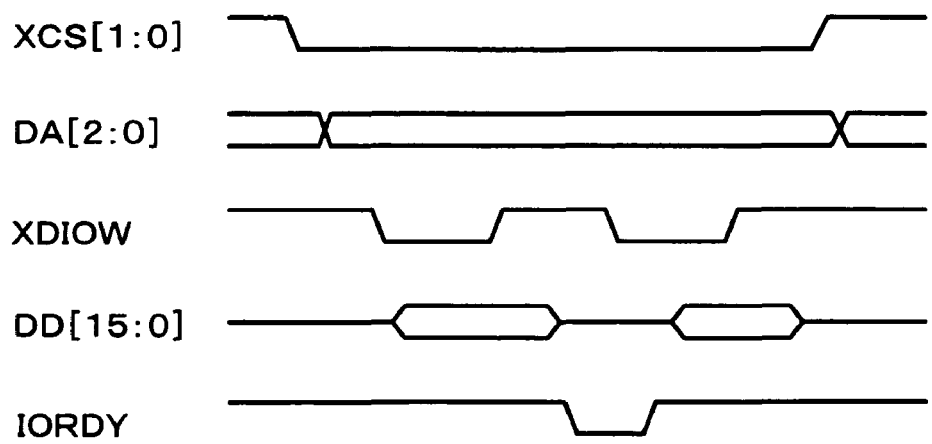

FIG. 4A  DMA READ
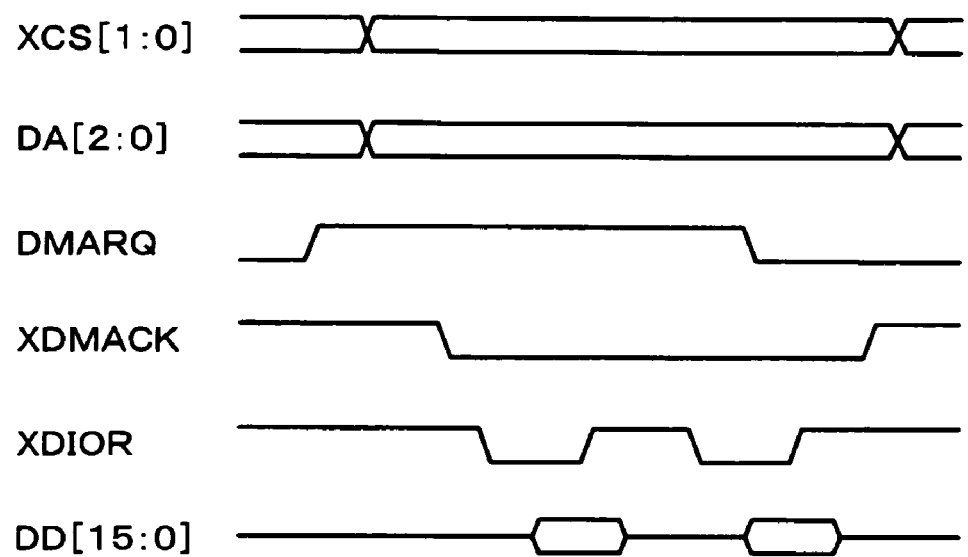
FIG. 4B  DMA WRITE
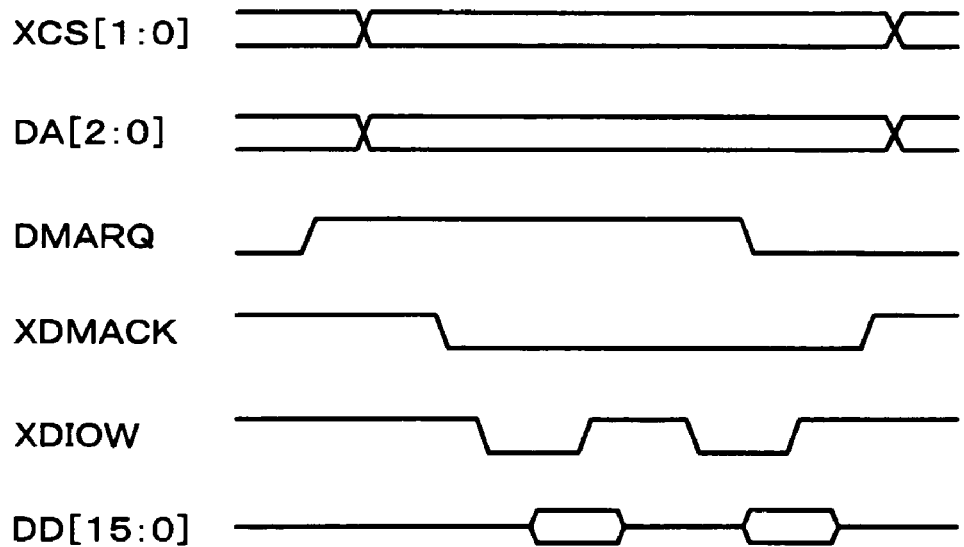

FIG. 7

| Address | | | | | Function | |
|---|---|---|---|---|---|---|
| XCS0 | XCS1 | DA2 | DA1 | DA0 | Read(XDIOR) | Write(XDIOW) |
| | | | | | Control Block Registers | |
| H | L | L | L | L | Released | not used |
| H | L | L | L | H | Released | not used |
| H | L | L | H | L | Released | not used |
| H | L | L | H | H | Released | not used |
| H | L | H | L | L | Released | not used |
| H | L | H | L | H | Released | not used |
| H | L | H | H | L | Alternate Status | Device Control |
| H | L | H | H | H | Obsolete | not used |
| | | | | | Command Block Registers | |
| L | H | L | L | L | Data | |
| L | H | L | L | H | Error Register | Features |
| L | H | L | H | L | Sector Count Register | |
| L | H | L | H | H | Sector Number Register (LBA LL) | |
| L | H | H | L | L | Cylinder low Register (LBA LH) | |
| L | H | H | L | H | Cylinder high Register (LBA HL) | |
| L | H | H | H | L | Drive/head | |
| L | H | H | H | H | Status | ATA Command |

FIG. 8A REGISTER FIS (HOST TO DEVICE)

| 0 | Features | Command | C | R | R | Reserved (0) | FIS Type (27h) |
|---|---|---|---|---|---|---|---|
| 1 | Dev/Head | Cyl High | Cyl Low | | | | Sector Number |
| 2 | Features (exp) | Cyl High (exp) | Cyl Low (exp) | | | | Sector Num (exp) |
| 3 | Control | Reserved (0) | Sector Count (exp) | | | | Sector Count |
| 4 | Reserved (0) | Reserved (0) | Reserved (0) | | | | Reserved (0) |

FIG. 8B REGISTER FIS (DEVICE TO HOST)

| 0 | Error | Status | R | I | R | Reserved (0) | FIS Type (34h) |
|---|---|---|---|---|---|---|---|
| 1 | Dev/Head | Cyl High | Cyl Low | | | | Sector Number |
| 2 | Reserved (0) | Cyl High (exp) | Cyl Low (exp) | | | | Sector Num (exp) (0) |
| 3 | Reserved (0) | Reserved (0) | Sector Count (exp) | | | | Sector Count |
| 4 | Reserved (0) | Reserved (0) | Reserved (0) | | | | Reserved (0) |

FIG. 8C PIO SETUP FIS

| 0 | Error | Status | R | I | D | Reserved (0) | FIS Type (5Fh) |
|---|---|---|---|---|---|---|---|
| 1 | Dev/Head | Cyl High | Cyl Low | | | | Sector Number |
| 2 | Reserved (0) | Cyl High (exp) | Cyl Low (exp) | | | | Sector Num (exp) (0) |
| 3 | E_Status | Reserved (0) | Sector Count (exp) | | | | Sector Count |
| 4 | Reserved (0) | | Transfer Count | | | | |

FIG. 8D DMA ACTIVATE FIS

| 0 | Reserved (0) | Reserved (0) | R | R | R | Reserved (0) | FIS Type (39h) |
|---|---|---|---|---|---|---|---|

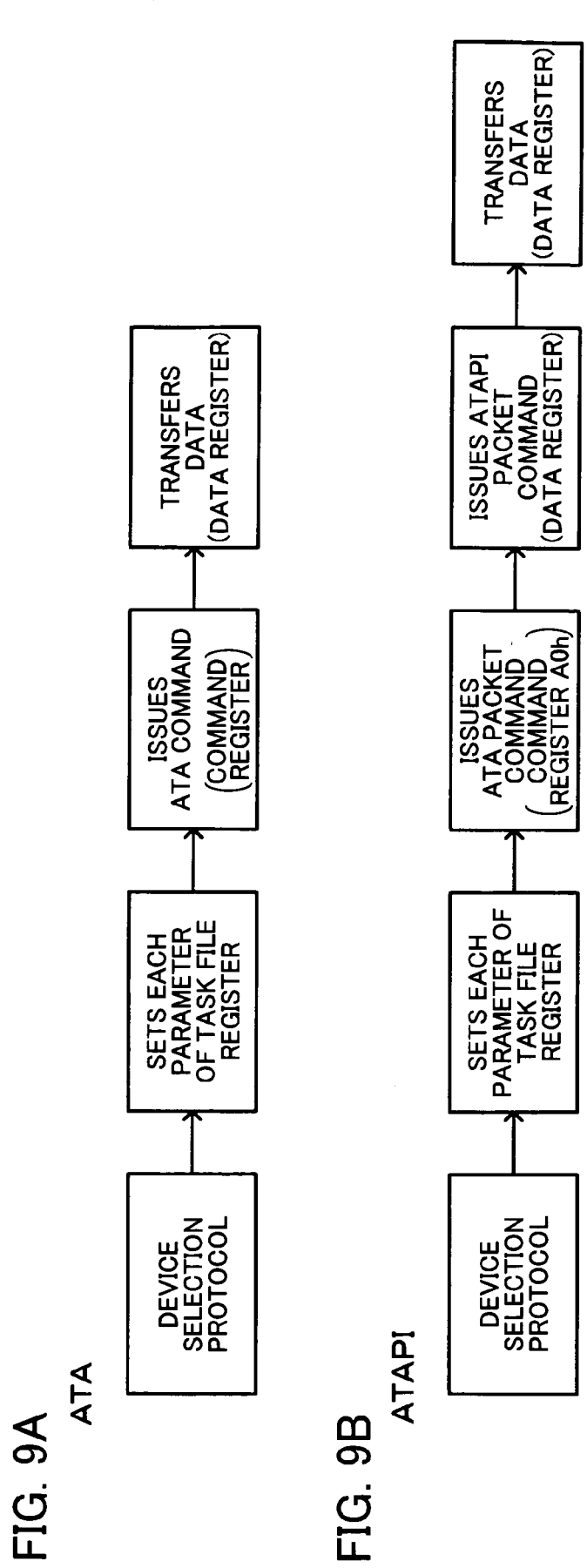
FIG. 9A ATA
FIG. 9B ATAPI

FIG. 10A

| REGISTER | 7 | 6 | 5 | 4 | 3 | 2 | 1 | 0 |
|---|---|---|---|---|---|---|---|---|
| Device Control | na | na | na | na | 1 | SRST | nIEN | na |
| Features | na | na | na | na | na | na | OVL | DMA |
| Sector Count | TAG | | | | | na | na | na |
| Sector Number | na | | | | | | | |
| Byte Count Low | Byte Count Limit | | | | | | | |
| Byte Count High | Byte Count Limit | | | | | | | |
| Device/Head | obs | na | obs | DEV | na | na | na | na |
| Commamd | A0h | | | | | | | |

| REGISTER | 7 | 6 | 5 | 4 | 3 | 2 | 1 | 0 |
|---|---|---|---|---|---|---|---|---|
| Error | na | | | | | | | |
| Interrupt Reason | TAG | | | | | REL | I/O | C/D |
| Sector Number | na | | | | | | | |
| Byte Count Low | Byte Count | | | | | | | |
| Byte Count High | Byte Count | | | | | | | |
| Device/Head | obs | na | obs | DEV | na | na | na | na |
| Status | BUSY | DRDY | DMRD | SERV | DRQ | na | na | CHK |

| SPECIFIC COMMAND |
|---|
| READ10 (28h)<br>READ12 (A8h)<br>READ CD (BEh)<br>READ CD MSF (B9h)<br>WRITE10 (2Ah)<br>WRITE12 (AAh) |
| COMMAND OTHER THAN SPECIFIC COMMAND |
| GET CONFIGURATION (46h)<br>GET PERFORMANCE (ACh)<br>INQUIRY (12h)<br>LOAD/UNLOAD MEDIUM (A6h)<br>MODE SELECT10 (55h)<br>MODE SENSE10 (5Ah)<br>PLAY CD (BCh)<br>⋮ |

DATA TRANSFER CONTROL DEVICE AND ELECTRONIC INSTRUMENT

Japanese Patent Application No. 2007-136152 filed on May 23, 2007, is hereby incorporated by reference in its entirety.

BACKGROUND OF THE INVENTION

The present invention relates to a data transfer control device and an electronic instrument.

In recent years, the Serial AT Attachment (Serial ATA) standard has attracted attention aimed at a serial interface for storage devices and the like. The Serial ATA standard has software-level compatibility with the Parallel ATA (IDE) standard. The data transfer rate of the original Serial ATA I standard is 1.5 Gbps. In the next Serial ATA II Gen2 standard, the data transfer rate is increased 3.0 Gbps. The number of interconnects provided between circuit boards included in an electronic instrument can be reduced utilizing the Serial ATA standard, whereby the size of the electronic instrument can be reduced.

On the other hand, a host (host device or host board) of an electronic instrument includes a parallel ATA (hereinafter appropriately referred to as "PATA") interface (hereinafter appropriately referred to as "I/F"), but generally does not include a Serial ATA (hereinafter appropriately referred to as "SATA") I/F. Therefore, a SATA device cannot be connected to a host which includes only a PATA I/F.

Devices such as a hard disk drive (HDD) have been increasingly equipped with a SATA I/F instead of a PATA I/F. Therefore, it is difficult to obtain an HDD equipped with a PATA I/F. As a result, the type of HDD which can be connected to a host which includes only a PATA I/F is limited, whereby an increase in capacity of a built-in HDD of electronic instruments is hindered.

The AT Attachment Packet Interface (ATAPI) standard is known as an interface standard for multimedia devices such as CD drives and DVD drives. The ATAPI standard employs a packet command concept in order to minimize the expansion of ATA commands. According to the ATAPI standard, a device other than an HDD can be connected to an HDD ATA (IDE) controller. Therefore, when providing a data transfer control device with a PATA/SATA bridge function, it is desirable that the data transfer control device appropriately implement ATAPI data transfer.

JP-A-2005-346123 and JP-A-2006-121621 disclose a SATA/PATA bridge IC. JP-A-2005-346123 and JP-A-2006-121621 disclose inventions relating to a circuit board using the bridge IC and the like, but do not disclose an invention relating to a specific configuration of the bridge IC.

JP-A-2006-18428 discloses an HDD including a SATA bridge. The SATA bridge disclosed in JP-A-2006-18428 is a bridge in which a host is connected to the SATA side and a device is connected to the PATA side. Specifically, JP-A-2006-18428 does not disclose an invention relating to a bridge in which a host is connected to the PATA side and a device is connected to the SATA side. JP-A-2006-18428 discloses an invention characterized by protocol control using firmware, but does not disclose a characteristic circuit configuration.

SUMMARY

According to one aspect of the invention, there is provided a data transfer control device having a bus bridge function between a Parallel ATA and a Serial ATA, the data transfer control device comprising:

a Parallel ATA interface that is connected to a Parallel ATA bus and interfaces between the data transfer control device and a host;

a Serial ATA interface that is connected to a Serial ATA bus and interfaces between the data transfer control device and a Serial ATA device; and a sequence controller that controls a transfer sequence, the Parallel ATA interface including a task file register; and when the host has issued an ATA packet command, the sequence controller suspending transmission of a register FIS corresponding to the ATA packet command to the device, performing a dummy setting that causes the host to issue an ATAPI packet command corresponding to the ATA packet command using the task file register, and transmitting the register FIS corresponding to the ATA packet command to the device after the host has issued the ATAPI packet command, a command packet of the ATAPI packet command being set in a data register of the task file register.

According to another aspect of the invention, there is provided an electronic instrument comprising:

the above data transfer control device;

the host that is connected to the data transfer control device; and the device that is connected to the data transfer control device.

BRIEF DESCRIPTION OF THE SEVERAL VIEWS OF THE DRAWING

FIGS. 3A and 3B show signal waveform examples during PIO read and PIO write.

FIGS. 4A and 4B show signal waveform examples during DMA read and DMA write.

FIG. 7 shows a format example of a task file register.

FIGS. 8A to 8D show format examples of an FIS.

FIGS. 9A and 9B are views illustrative of ATA and ATAPI command protocols.

FIGS. 10A and 10B show examples of a parameter and a status register of a packet command.

FIG. 22 shows examples of a specific command and a command other than a specific command.

DETAILED DESCRIPTION OF THE EMBODIMENT

Figure 1:
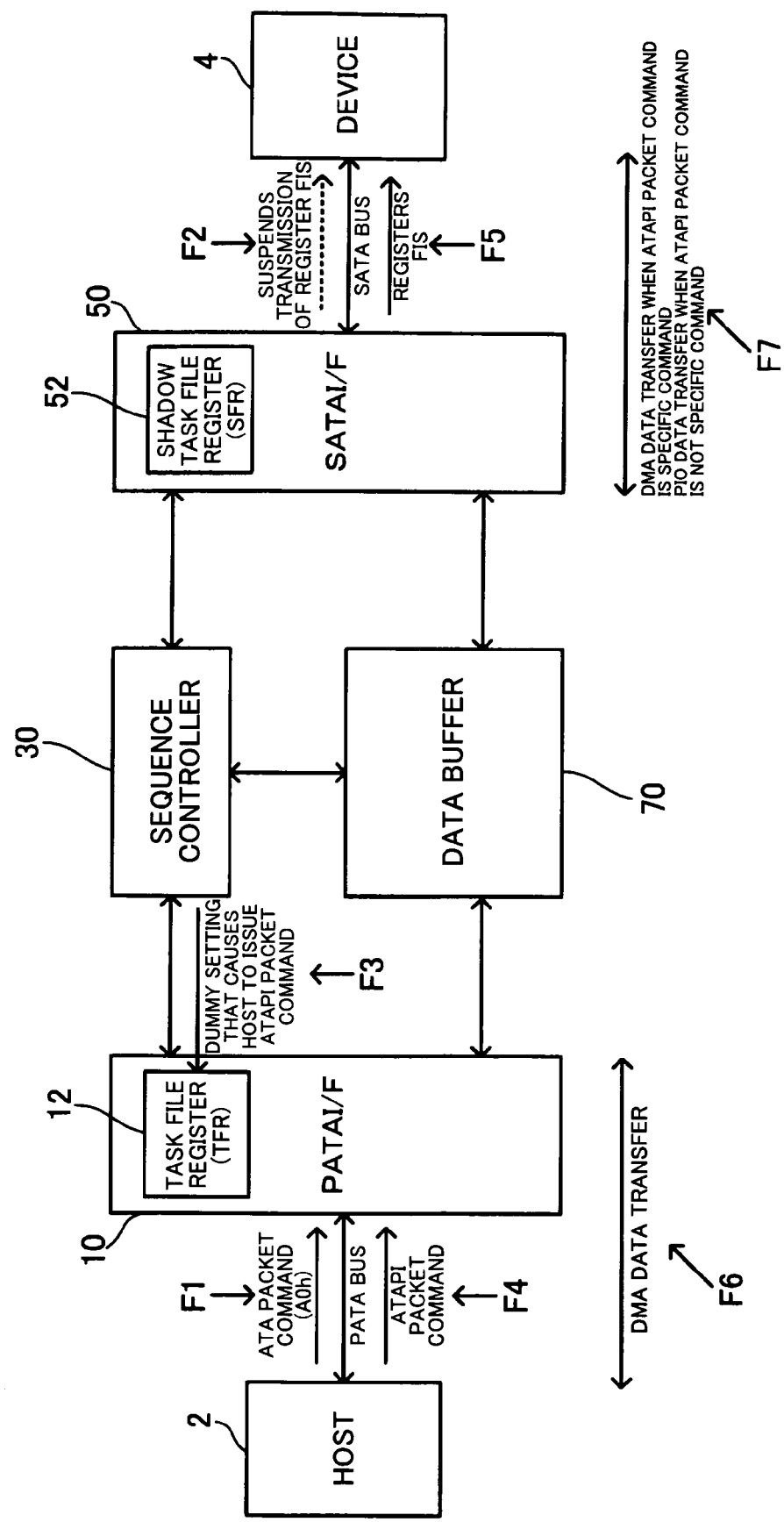
FIG. 1 shows a configuration example of a data transfer control device according to one embodiment of the invention.

Several embodiments of the invention may appropriately implement ATAPI data transfer while implementing an ATA/SATA bus bridge function.

According to one embodiment of the invention, there is provided a data transfer control device having a bus bridge function between a Parallel ATA and a Serial ATA, the data transfer control device comprising:

a Parallel ATA interface that is connected to a Parallel ATA bus and interfaces between the data transfer control device and a host;

a Serial ATA interface that is connected to a Serial ATA bus and interfaces between the data transfer control device and a Serial ATA device; and a sequence controller that controls a transfer sequence, the Parallel ATA interface including a task file register; and when the host has issued an ATA packet command, the sequence controller suspending transmission of a register FIS corresponding to the ATA packet command to the device, performing a dummy setting that causes the host to issue an ATAPI packet command corresponding to the ATA packet command using the task file register, and transmitting the register FIS corresponding to the ATA packet command to the device after the host has issued the ATAPI packet command, a command packet of the ATAPI packet command being set in a data register of the task file register.

According to this embodiment, when the host has issued the ATA packet command, transmission of the register FIS corresponding to the ATA packet command is suspended, and a dummy setting that causes the host to issue an ATAPI packet command is performed using the TFR. When the host has issued the ATAPI packet command based on the dummy setting, the register FIS corresponding to the ATA packet command is transmitted to the device. This makes it possible to control the transfer sequence by causing the host to issue the ATAPI packet command before transmitting the register FIS to the device. Therefore, ATAPI data transfer can be appropriately implemented while implementing an ATA/SATA bus bridge function.

In the data transfer control device according to this embodiment, the sequence controller may cause the host to issue the ATAPI packet command corresponding to the ATA packet command by performing the dummy setting that clears a busy bit and sets a data request bit using the task file register.

This enables the host to be notified that the busy bit has been cleared and to issue the ATAPI packet command.

In the data transfer control device according to this embodiment, the sequence controller may perform a transfer sequence setting for data transfer through the Parallel ATA interface before performing the dummy setting using the task file register.

This makes it possible to cause the Parallel ATA interface to receive the ATAPI packet command issued by the host based on the dummy setting so that appropriate transfer sequence control relating to the ATAPI packet command issued based on the dummy setting can be implemented.

In the data transfer control device according to this embodiment, the data transfer control device may further include a data buffer that buffers data transferred between the host and the device, the sequence controller may perform a transfer sequence setting for data transfer through the data buffer before performing the dummy setting using the task file register.

This makes it possible to cause the ATAPI packet command issued by the host based on the dummy setting to be stored in the data buffer so that appropriate transfer sequence control relating to the ATAPI packet command issued based on the dummy setting can be implemented.

In the data transfer control device according to this embodiment, when the host has issued the ATAPI packet command, the sequence controller may decode the issued ATAPI packet command;

when the sequence controller has determined that the ATAPI packet command is a specific command based on a decoding result, the Parallel ATA interface and the Serial ATA interface may perform DMA data transfer with the host and the device, respectively; and when the sequence controller has determined that the ATAPI packet command is not the specific command based on the decoding result, the Parallel ATA interface may perform DMA data transfer with the host, and the Serial ATA interface may perform PIO data transfer with the device.

According to this configuration, since the Parallel ATA side and the Serial ATA side perform DMA data transfer when the ATAPI packet command is the specific command, the data transfer efficiency can be improved. On the other hand, since the Parallel ATA side performs DMA data transfer and the Serial ATA side performs PIO data transfer when the ATAPI packet command is not the specific command, appropriate data transfer control can be implemented.

In the data transfer control device according to this embodiment, the data transfer control device may further include a data buffer that buffers data transferred between the host and the device, the sequence controller may decode the ATAPI packet command temporarily stored in the data buffer.

This makes it possible to decode the ATAPI packet command before the data FIS corresponding to the ATAPI packet command is transmitted to the device and perform transfer sequence control based on the decoding result.

In the data transfer control device according to this embodiment, the Serial ATA interface may include a shadow task file register; and when the sequence controller has determined that the ATAPI packet command is not the specific command, the sequence controller may rewrite the DMA bit by a PIO setting, and may transfer a register value from the task file register to the shadow task file register, the DMA bit of the register value being rewritten by the PIO setting.

The Serial ATA side can be set in the PIO transfer mode while setting the Parallel ATA side in the DMA transfer mode by rewriting the DMA bit by the PIO setting.

In the data transfer control device according to this embodiment, when the ATAPI packet command that is not the specific command has been issued, and the Serial ATA interface has transmitted a data FIS that includes the command packet to the device and received a PIO setup FIS from the device, the Parallel ATA interface may perform DMA data transfer with the host, and the Serial ATA interface may perform PIO data transfer with the device.

Since the data byte count of each PIO transfer can be managed by performing PIO data transfer in this manner, a situation in which conformity relating to the transfer byte count cannot be achieved can be prevented. Therefore, ATAPI data transfer can be appropriately implemented while implementing an ATA/SATA bus bridge function.

In the data transfer control device according to this embodiment, the sequence controller may start free-run transfer that does not manage a total data transfer count when the sequence controller has received the PIO setup FIS from the device that has received the data FIS.

Since a circuit which counts the total data transfer count becomes unnecessary by performing free-run transfer, the circuit scale of the data transfer control device can be reduced.

In the data transfer control device according to this embodiment, the sequence controller may perform sequence control of the free-run transfer by determining a transfer direction and a transfer type of data based on the received PIO setup FIS.

This implements appropriate transfer sequence control in which the transfer direction and the transfer type are set.

In the data transfer control device according to this embodiment, the sequence controller may manage a transfer byte count of each PIO transfer during the free-run transfer based on a transfer count set in the PIO setup FIS received from the device.

This enables appropriate data transfer in which conformity relating to the transfer byte count is achieved to be implemented even when using the free-run transfer method which does not manage the total data transfer count.

In the data transfer control device according to this embodiment, the sequence controller may finish the free-run transfer when the sequence controller has received a register FIS from the device after the free-run transfer has started.

This makes it possible to determine whether or not to finish free-run transfer by merely determining whether or not the received FIS is a register FIS, whereby the circuit can be simplified and reduced in scale.

In the data transfer control device according to this embodiment, when the ATAPI packet command that is the specific command has been issued, and the Serial ATA interface has transmitted a data FIS that includes the command packet to the device and received a data FIS from the device, the Parallel ATA interface may perform DMA read data transfer with the host, and the Serial ATA interface may perform DMA read data transfer with the device.

According to this configuration, since the Parallel ATA side and the Serial ATA side perform DMA read data transfer, the transfer efficiency relating to a specific DMA read command can be improved.

In the data transfer control device according to this embodiment, when the ATAPI packet command that is the specific command has been issued, and the Serial ATA interface has transmitted a data FIS that includes the command packet to the device and received a DMA activate FIS from the device, the Parallel ATA interface may perform DMA write data transfer with the host, and the Serial ATA interface may perform DMA write data transfer with the device.

According to this configuration, since the Parallel ATA side and the Serial ATA side perform DMA write data transfer, the transfer efficiency relating to a specific DMA write command can be improved.

According to another embodiment of the invention, there is provided an electronic instrument comprising:

one of the above data transfer control device;

the host that is connected to the data transfer control device; and the device that is connected to the data transfer control device.

Preferred embodiments of the invention are described in detail below. Note that the embodiments described below do not in any way limit the scope of the invention defined by the claims laid out herein. Note that all elements of the embodiments described below should not necessarily be taken as essential requirements for the invention.

1. Configuration of Data Transfer Control Device

FIG. 1 shows a configuration example of a data transfer control device according to one embodiment of the invention. The data transfer control device has a Parallel AT Attachment (PATA)/Serial AT Attachment (SATA) bus bridge function.

Note that the data transfer control device according to this embodiment is not limited to the configuration shown in FIG. 1. Various modifications may be made such as omitting some elements (e.g., data buffer) or adding other elements (e.g., external I/F circuit, CPU, or timer). For example, the data transfer control device according to this embodiment may implement a PATA/USB bus bridge function, a PATA/secure digital (SD) card interface bus bridge function, and a PATA/CE-ATA bus bridge function in addition to a PATA/SATA bus bridge function.

A PATA I/F 10 (parallel ATA interface) is connected to a PATA bus (ATA bus or IDE bus), and interfaces between the data transfer control device and a host 2 (host device). Specifically, the PATA I/F 10 is connected to a host-side PATA I/F included in the host 2 through the PATA bus. The PATA I/F 10 exchanges various ATA signals described later with the host-side PATA I/F to implement PATA (IDE) data transfer. The PATA I/F 10 also controls data transfer with an SATA I/F 50 through a data buffer 70. The PATA I/F 10 may include a task file register 12 which is a pseudo (virtual) register provided for a PATA/SATA bus bridge.

The host 2 may be a processor such as a CPU, an MPU, or a DSP, a dedicated control IC, a host circuit board provided with such a processor or dedicated control IC, or the like. A device 4 may be a device provided with an SATA I/F, such as a hard disk drive (HDD), an optical disk (CD or DVD) drive, or a magnetic disk drive.

The SATA I/F 50 (Serial ATA interface) is connected to an SATA bus (high-speed serial bus), and interfaces between the data transfer control device and the SATA device 4. Specifically, the SATA I/F 50 is connected to a device-side SATA I/F included in the device 4, and exchanges data using small-amplitude differential signals to implement SATA data transfer. The SATA I/F 50 also controls data transfer with the PATA I/F 10 through the data buffer 70. The SATA I/F 50 may include an SATA shadow task file register 52.

A sequence controller 30 controls a transfer sequence. Specifically, the sequence controller 30 controls a data transfer sequence among the PATA I/F 10, the SATA I/F 50, and the data buffer 70, or controls a register value transfer sequence in order to implement a PATA/SATA bridge function.

The data buffer 70 buffers data transferred between the host 2 (PATA I/F) and the device 4 (SATA I/F). The data buffer 70 functions as a buffer (FIFO) which absorbs the difference in clock frequency between the PATA side and the SATA side. For example, when the PATA-side clock frequency is 50 MHz (or 60 MHz) and the SATA-side clock frequency is 37.5 MHz, the difference in clock frequency can be absorbed by providing the data buffer 70. The data buffer 70 may be implemented by a dual-port memory (RAM) including a first port on the PATA I/F 10 side through which data is input and output at 50 MHz (first frequency) and a second port on the SATA I/F 50 side through which data is input and output at 37.5 MHz (second frequency), for example.

According to the configuration shown in FIG. 1, even when the host 2 includes only the PATA I/F, the device 4 including the SATA I/F can be connected to the host 2 through the data transfer control device. Therefore, existing PATA (IDE) firmware and software can be utilized as firmware and software for the host 2. This makes it possible to reduce the development period and the cost of electronic instruments. Moreover, since a commercially-available large-capacity HDD can be connected to the host 2 as the device 4, the capacity of a built-in HDD of electronic instruments can be increased.

Furthermore, since a circuit board provided with the host 2 and a circuit board provided with the device 4 can be connected through an SATA bus (serial bus), the number of interconnects provided between the circuit boards can be reduced, whereby the size of electronic instruments can be reduced.

In this embodiment, when the host 2 has issued an ATA packet command (A0h), as indicated by F1 in FIG. 1, the data transfer control device suspends (temporarily stops) transmission of a register FIS corresponding to the ATA packet command to the device 4, as indicated by F1.

The data transfer control device then performs a dummy setting which causes the host 2 to issue an ATAPI packet command corresponding to the issued ATA packet command using the task file register (TFR) 12, as indicated by F3. For example, the data transfer control device sets a BUSY bit at 0, sets a data request (DRQ) bit at 1, sets a C/D bit at 1, and sets an I/O bit at 0, as described later.

After the host 2 has issued the ATAPI packet command of which the command packet is set in a data register, as indicated by F4, the data transfer control device performs transfer sequence control for transmitting the register FIS corresponding to the ATA packet command to the device 4, as indicated by F5. Specifically, the data transfer control device transmits the transmission-suspended register FIS to the device 4.

When the host 2 has issued the ATAPI packet command, as indicated by F4, the data transfer control device decodes the issued ATAPI packet command. Specifically, the data transfer control device temporarily stores the ATAPI packet command in the data buffer 70, and then decodes the ATAPI packet command. When the data transfer control device has determined that a DMA bit of the ATA packet command is set at 1 and the ATAPI packet command is a specific command (e.g., READ10, READ12, READ CD, READ CD MSF, WRITE10, or WRITE12) based on the decoding result, the PATA I/F 10 and the SATA I/F 50 perform DMA data transfer with the host 2 and the device 4, respectively, as indicated by F6 and F7. When the data transfer control device has determined that the DMA bit of the ATA packet command is set at 1 and the ATAPI packet command is not a specific command based on the decoding result, the PATA I/F 10 performs DMA data transfer with the host 2, and the SATA I/F 50 performs PIO data transfer with the device 4. Specifically, the SATA I/F 50 performs data transfer using a PIO setup FIS and a data FIS.

The SATA data transfer unit is four bytes, for example. In the ATAPI standard, data which cannot be divided by four bytes can be designated as the payload. Therefore, when performing ATAPI DMA transfer, SATA-side odd data is padded with dummy data. If the dummy data is transferred to the host, the actual total transfer byte count differs from the set transfer byte count (i.e., conformity relating to the transfer byte count cannot be achieved).

In this embodiment, when the issued ATAPI packet command is not a specific command, the PATA side performs DMA data transfer while the SATA side performs PIO data transfer using a PIO setup FIS, as indicated by F6 and F7 in FIG. 1. This enables the transfer byte count of each PIO transfer to be managed using the transfer count of the PIO setup FIS. This effectively prevents a situation in which dummy data is transferred to the host 2 so that conformity relating to the transfer byte count cannot be achieved.

When the issued ATAPI packet command is a specific command and ATAPI DMA transfer is performed, the PATA side and the SATA side perform DMA data transfer, as indicated by F6 and F7 in FIG. 1. Specifically, since data with a large size is read or written when the ATAPI packet command is a specific command (e.g., READ10 or WRITE10), a high-speed data transfer is desired. Since data which can be divided by four bytes is designated as the payload when using a specific command, the data is not padded with dummy data. Therefore, the transfer efficiency can be improved and a decrease in data transfer rate can be prevented by causing the PATA side and the SATA side to perform DMA transfer when DMA transfer is designated using a specific command.

In order to employ such a method, it is necessary for the data transfer control device to decode an ATAPI packet command from the host 2 and determine whether or not the ATAPI packet command is a specific command before transmitting a register FIS to the device 4.

In FIG. 1, the data transfer control device suspends transmission of the register FIS to the device 4 when the host 2 has issued an ATA packet command, as indicated by F2, and performs a dummy setting which causes the host 2 to issue an ATAPI packet command, as indicated by F3. According to this configuration, the data transfer control device can decode the ATAPI packet command from the host 2 before transmitting the register FIS to the device 4, and implement transfer sequence control based on the decoding result. Specifically, the data transfer control device can implement transfer sequence control that sets the PATA side and the SATA side in a DMA transfer mode when the ATAPI packet command is a specific command, and sets the SATA side in a PIO transfer mode when the ATAPI packet command is not a specific command, for example. This prevents a situation in which conformity relating to the transfer byte count cannot be achieved while preventing a decrease in data transfer rate.

2. Detailed Configuration Example

Figure 2:
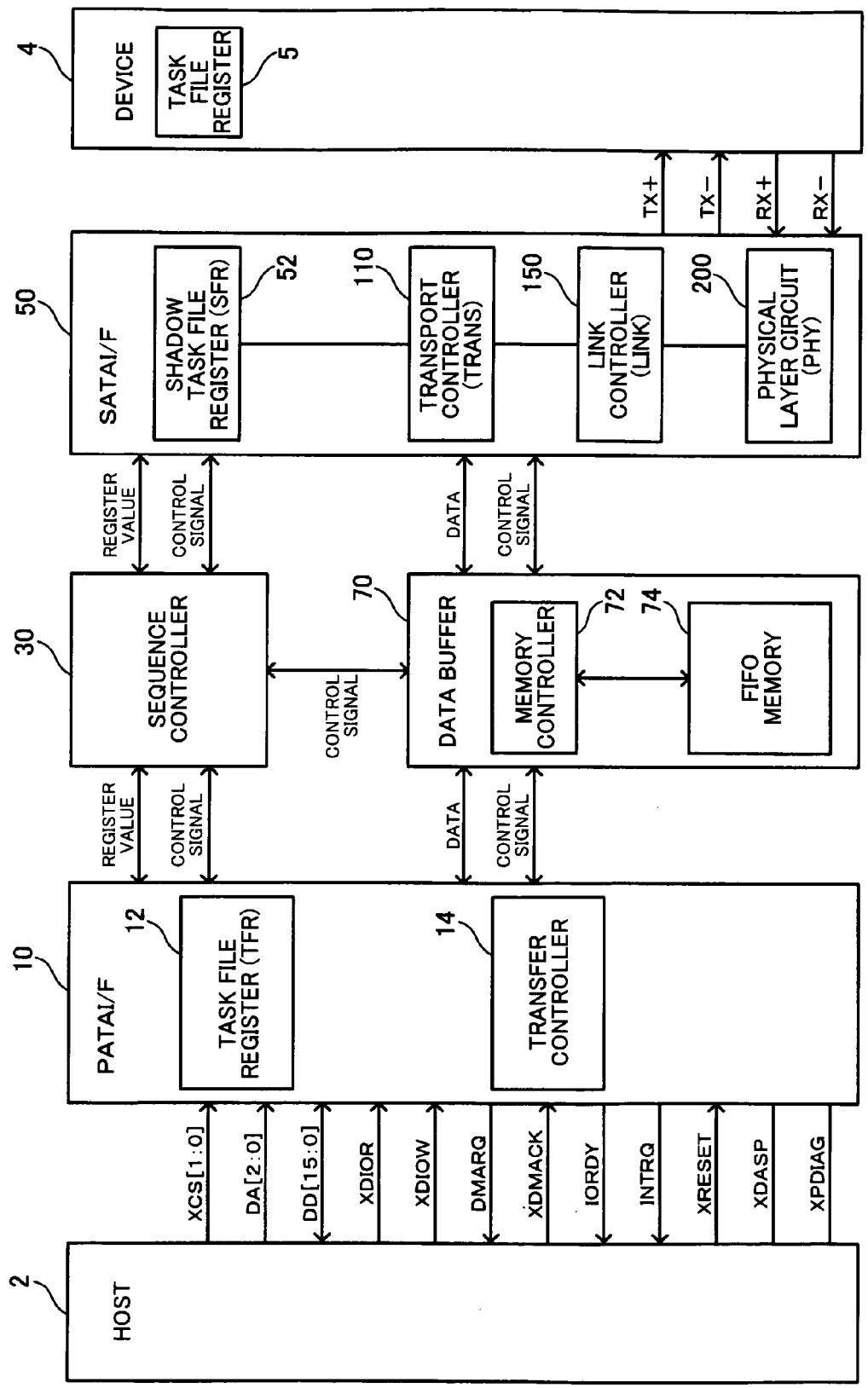
FIG. 2 shows a detailed configuration example of a data transfer control device according to one embodiment of the invention.

FIG. 2 shows a detailed configuration example of the data transfer control device. The PATA I/F 10 includes the task file register (hereinafter appropriately referred to as "TFR") 12 and a transfer controller 14. The TFR 12 is a pseudo register provided for a PATA/SATA bus bridge. The host 2 can read and write data as if the SATA device 4 were a PATA device by providing the TFR 12. Specifically, the host 2 can control the SATA device 4 using existing PATA firmware and software.

The transfer controller 14 implements a PATA (IDE) interface using PATA signals XCS to XPDIAG, and controls data transfer between the PATA I/F 10 and the data buffer 70 using a data transfer control signal.

The data buffer 70 includes a memory controller 72 and a FIFO memory (FIFO RAM) 74. The memory controller 72 controls writing and reading of data into and from the FIFO memory 74. The memory controller 72 also controls data transfer between the data buffer 70 and the PATA I/F 10 or the SATA I/F 50 using control signals (e.g., REQ signal and ACK signal).

The SATA I/F 50 includes the shadow task file register (hereinafter appropriately referred to as "SFR") 52, a transport controller 110, a link controller 150, and a physical layer circuit 200.

The transport controller 110, the link controller 150, and the physical layer circuit 200 are circuits that respectively perform a transport layer process, a link layer process, and a physical layer process defined in the SATA standard.

The shadow task file register (SFR) 52 is a register defined in the SATA standard. Specifically, the SATA standard maintains software-level compatibility with the PATA (IDE) standard, and is characterized in that two task file registers are used. The two task file registers include the host (HBA)-side shadow task file register 52 and a device-side original task file register 5.

The task file register (TFR) 12 provided in the PATA I/F 10 is not a register defined in the SATA standard. The task file register 12 is a pseudo register provided for a PATA/SATA bridge. The host 2 identifies and accesses the task file register 12 as a PATA task file register, and writes or reads a register value into or from the task file register 12. The data transfer control device according to this embodiment then transfers the register value set in the task file register 12 to the shadow task file register 52, or transfers the register value set in the shadow task file register 52 to the task file register 12, for example.

According to this configuration, when the host 2 has written a register value into the PATA task file register 12, the register value is transferred to and written into the SATA shadow task file register 52, and is transferred to the device 4 through the SATA bus using an FIS. A register value written into the shadow task file register 52 using an FIS from the device 4 is transferred to the task file register 12, and is read by the host 2. Therefore, since the host 2 can read and write data as if the SATA device 4 were a PATA device, a PATA/SATA bridge function can be efficiently implemented.

The register value may be transferred between the task file register (TFR) 12 and the shadow task file register (SFR) 52 using the following method. Specifically, bits (all bits) of the registers of the TFR 12 and bits (all bits) of the registers of the SFR 52 are connected through signal lines via the sequence controller 30. When transferring the register value, the sequence controller 30 generates a transfer trigger signal, and the register value set in the TFR 12 is transferred to the SFR 52 or the register value set in the SFR 52 is transferred to the TFR 12 based on the transfer trigger signal.

3. PATA I/F

The data transfer process of the PATA I/F 10 is described below with reference to the configuration shown in FIG. 2 and signal waveforms shown in FIGS. 3A to 4B.

A signal XCS[1:0] is a chip select signal used to access each PATA register. A signal DA[2:0] is an address signal used to access data or a data port. Signals DMARQ and XDMACK are signals used for DMA transfer. The device activates (asserts) the signal DMARQ when preparations for data transfer have been completed, and the host activates the signal XDMACK in response to the signal DMARQ.

A signal XDIOW is a write signal used to write data into a register or a data port. A signal XDIOR is a read signal used to read data from a register or a data port. A signal IORDY is used as a wait signal or the like when device-side data transfer preparations have not been completed.

A signal INTRQ is a signal used for the device to request an interrupt to the host. When the host has read the information in a status register of the device-side TFR 12 after the signal INTRQ has become active, the device inactivates (negates) the signal INTRQ after a specific period of time has expired. The device can notify the host of completion of a command process using the signal INTRQ.

FIGS. 3A and 3B show signal waveform examples during PIO (programmed I/O) read and PIO write. Data is read from the status register of the PATA TFR 12 by PIO read shown in FIG. 3A, and data is written into a command register by PIO write shown in FIG. 3B. For example, issuance of an ATA command by the host 2 may be implemented by PIO write.

FIGS. 4A and 4B show signal waveform examples during DMA read and DMA write. The device (data transfer control device) activates the signal DMARQ when preparations for data transfer have been completed. The host activates the signal XDMACK in response to the signal DMARQ to initiate DMA transfer. The host then performs DMA transfer of data DD[15:0] using the signal XDIOR (during read) or XDIOW (during write).

4. SATA I/F

Figure 5:
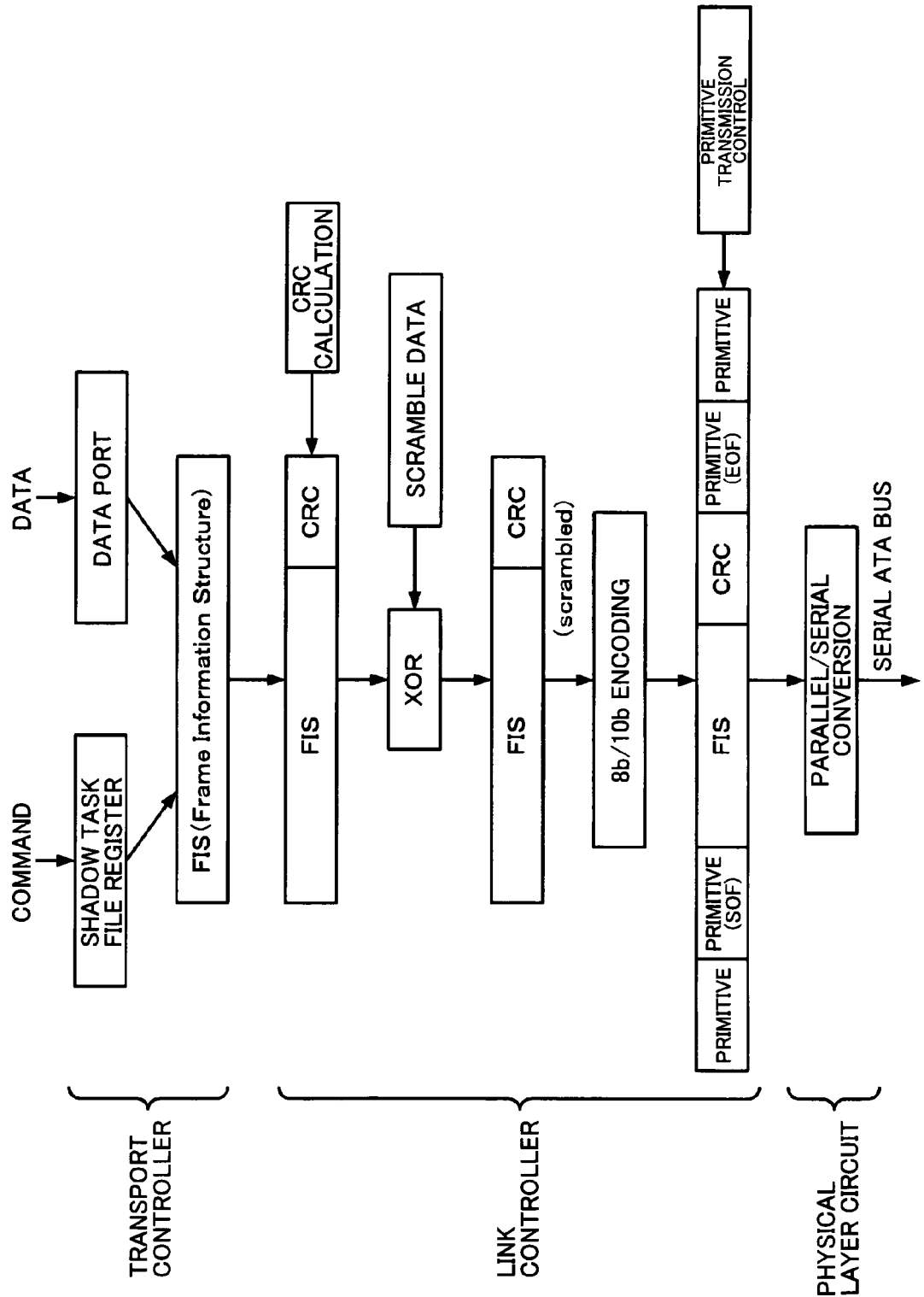
FIG. 5 is a view illustrative of SATA transmitter-side data processing.
Figure 6:
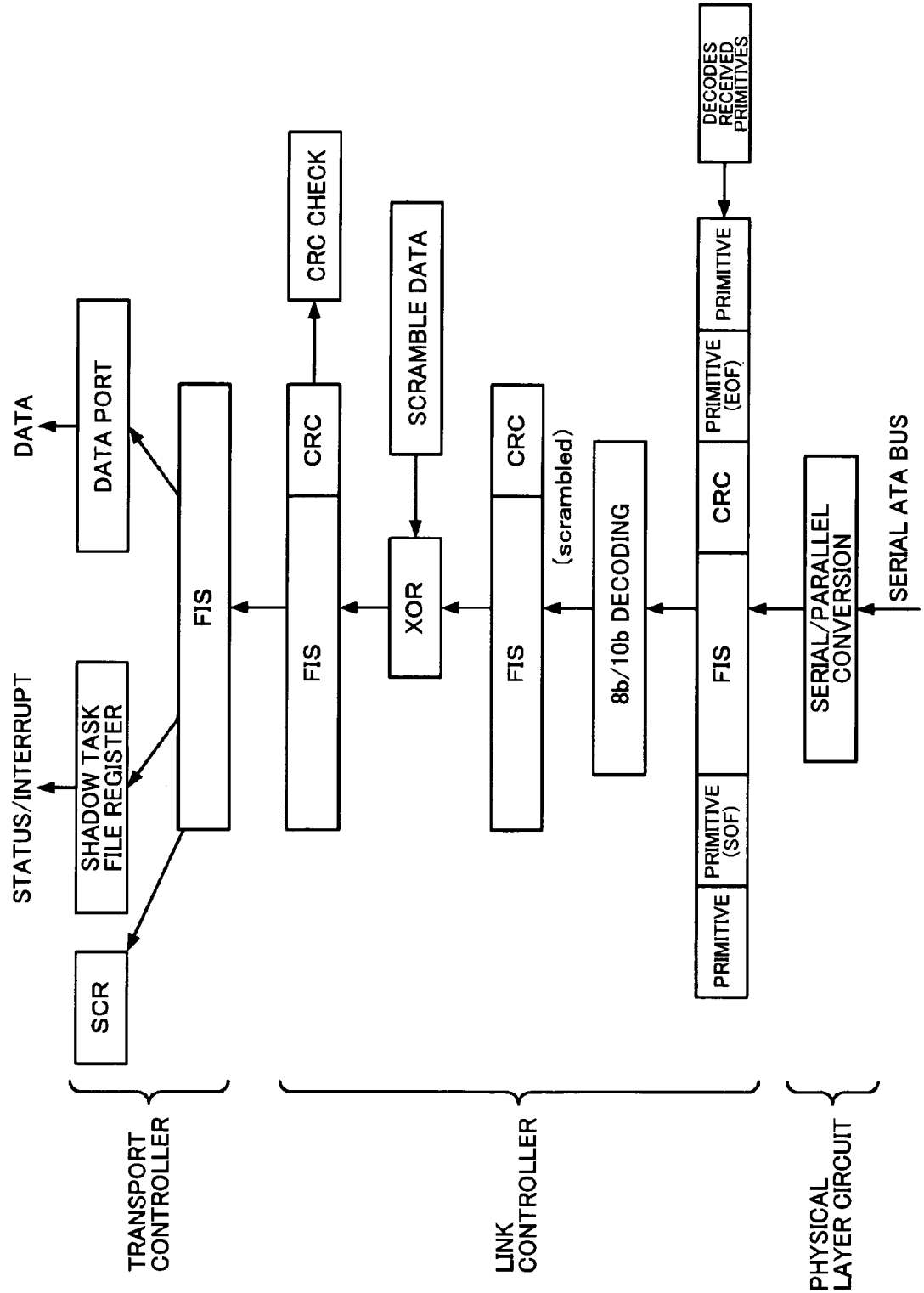
FIG. 6 is a view illustrative of SATA receiver-side data processing.

The data transfer process of the SATA I/F 50 is described below. FIG. 5 shows the flow of a SATA transmitter-side data transfer process, and FIG. 6 shows the flow of a receiver-side data transfer process.

As shown in FIG. 5, the transmitter-side transport controller (transport layer) generates an FIS based on a command written into the shadow task file register and data input to the data port. The FIS is a payload of a frame, and is formed in Dword (32 bits) units. The frame is an information unit exchanged between the host and the device. The frame includes a start of frame (SOF) primitive, an FIS, a cyclic redundancy check (CRC) calculated for the FIS, and an end of frame (EOF) primitive.

The transmitter-side link controller calculates the CRC for the FIS and adds the CRC to the end of the FIS. The transmitter-side link controller performs a scramble process which calculates the exclusive OR (XOR) of the FIS, the CRC, and scramble data. The transmitter-side link controller 8b/10b-encodes the FIS and CRC thus scrambled. The term "8b/10b encoding" refers to a data transmission encoding algorithm which converts 8-bit data into a 10-bit transmission character. 8b/10b encoding ensures successive transmission by adjusting the number of 1 and 0 in a symbol string. The primitives such as the SOF primitive and the EOF primitive are added to the 8b/10b-encoded FIS and CRC.

The transmitter-side physical layer circuit converts the parallel data from the link controller into serial data, and transmits the serial data to the SATA bus using small-amplitude differential signals.

As shown in FIG. 6, the receiver-side physical layer circuit converts the serial data received through the SATA bus into parallel data.

The receiver-side link controller decodes the primitives added to the FIS and the CRC. The receiver-side link controller 8b/10b-decodes the FIS and the CRC. Specifically, the receiver-side link controller converts the 10-bit transmission character into 8-bit data. The receiver-side link controller then performs a descramble process which calculates the exclusive OR of the scrambled FIS and CRC and scramble data. The receiver-side link controller checks the CRC added to the end of the FIS.

The receiver-side transport controller writes the FIS command into the shadow task file register to output the status and interrupt, and outputs data through the data port.

FIG. 7 shows a format example of the ATA task file register. The task file register includes a control block register and a command block register. The control block register is selected when chip select signals XCS0 and XCS1 are respectively set at the H level (negated) and the L level (asserted), and the command block register is selected when the chip select signals XCS0 and XCS1 are respectively set at the L level and the H level. The command block register includes a status register (Status) and an ATA command register (ATA Command).

FIGS. 8A to 8D show format examples of the FIS transmitted and received by the SATA I/F 50. FIG. 8A shows the format of a register FIS from the host to the device, FIG. 8B shows the format of a register FIS from the device to the host, FIG. 8C shows the format of a PIO setup FIS, and FIG. 8D shows the format of a DMA activate FIS.

5. ATAPI

The ATAPI command protocol is described below. In the ATA command protocol, as shown in FIG. 9A, a device selection protocol is performed, and each parameter (e.g., Features, Sector Number, and Sector Count) of the task file register shown in FIG. 7 is then set. An ATA command is issued using the command register of the task file register, and data is transferred using the data register of the task file register.

In the ATAPI command protocol, a device selection protocol is performed, and each parameter (e.g., Features and Sector Count) of the task file register is then set. An ATA packet command is then issued using the command register (A0h) of the task file register. An ATAPI packet command is then issued (transferred) using the data register of the task file register. After the ATAPI packet command has been transferred to the device, data is transferred using the data register of the task file register.

FIG. 10A shows an example of the parameters of the packet command, and FIG. 10B shows an example of the status register. When the host 2 performs ATAPI data transfer, the host 2 issues an ATA packet command in which a command A0h is set, as indicated by A1 in FIG. 10A. The host 2 sets a DMA bit indicated by A2 at 1 when performing DMA data transfer, and sets the DMA bit at 0 when performing PIO data transfer. The transfer direction is designated using an I/O bit indicated by A3 in FIG. 10B, and whether a command or data is transmitted is designated using a CAD bit indicated by A4.

According to the ATAPI standard, an ATAPI device can be connected to an ATA controller without changing the register map, hardware, and the like by employing the concept of the packet command transferred using the task file register.

6. Dummy Setting and Decoding of Specific Command

Since the transfer mode setting designated by the host 2 is transmitted to the device 4 through the data transfer control device having a bus bridge function, the SATA-side transfer mode is generally set to be the same as the PATA-side transfer mode. Specifically, when the PATA-side is set in the PIO transfer mode, the SATA side is also set in the PIO transfer mode. When the PATA side is set in the DMA transfer mode, the SATA side is also set in the DMA transfer mode.

In this embodiment, when the issued ATAPI packet command is not a specific command, the PATA side is set in the DMA transfer mode and the SATA side is set in the PIO transfer mode during DMA data transfer, as indicated by F6 and F7 in FIG. 1. This prevents a situation in which dummy data is transferred to the host so that conformity relating to the transfer byte count cannot be achieved, for example.

In this embodiment, when the issued ATAPI packet command is a specific command (READ10, READ12, READ CD, READ CD MSF, WRITE10, or WRITE12), the PATA side and the SATA side are set in the DMA data transfer mode, as indicated by F6 and F7 in FIG. 1. Since a high-speed data transfer can be achieved by DMA transfer as compared with PIO transfer, a decrease in data transfer rate can be prevented. Since data which can be divided by four bytes is designated as the payload and padding with dummy data is not performed using such a specific command, a situation in which dummy data is transferred to the host 2 so that conformity relating to the transfer byte count cannot be achieved does not occur.

The method according to this embodiment is described in detail below with reference to a transfer sequence shown in FIGS. 11 to 15 and FIGS. 16A to 21C.

Figure 11:
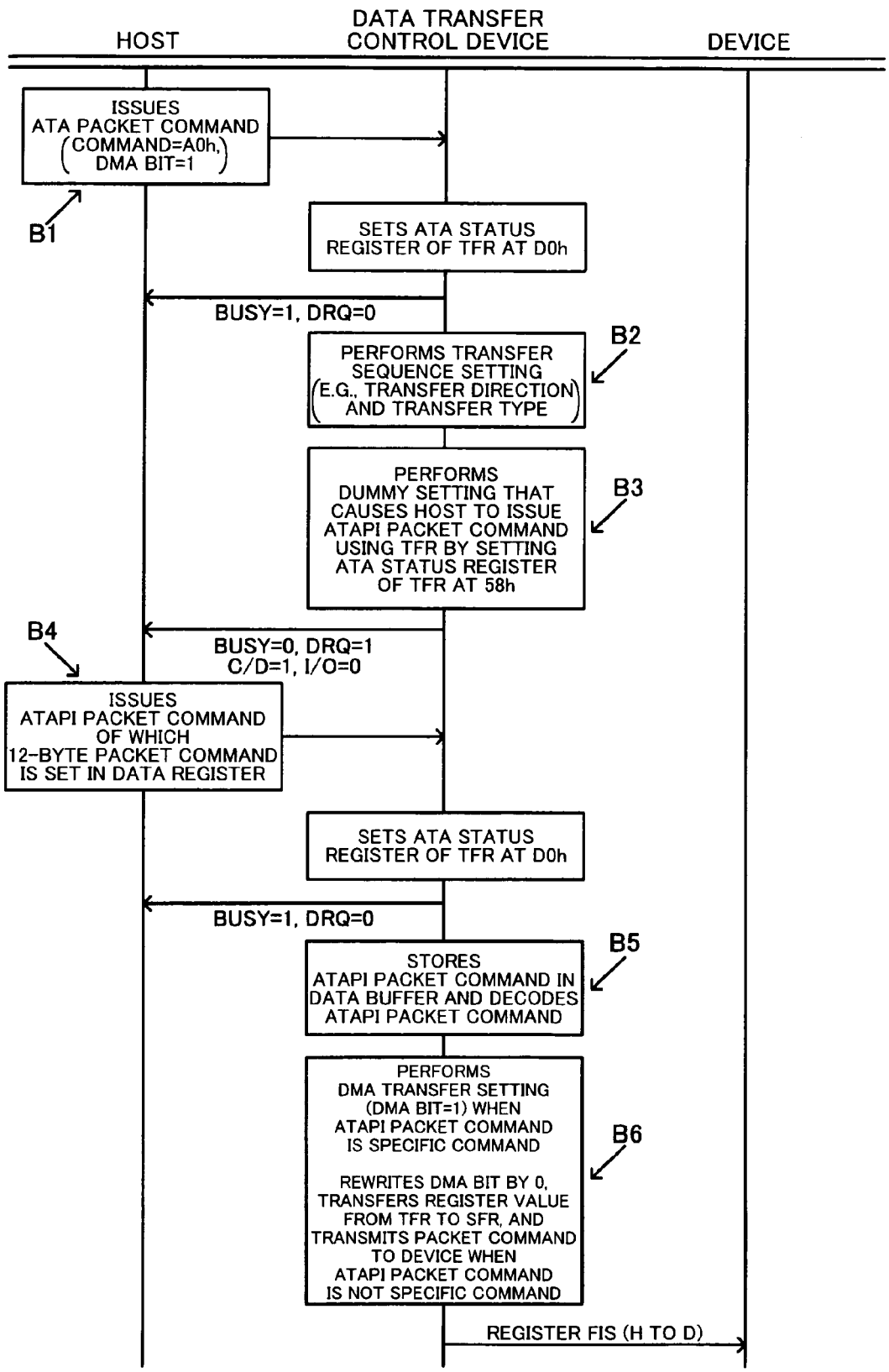
FIG. 11 is a transfer sequence diagram illustrative of a method according to one embodiment of the invention.
Figure 16A:
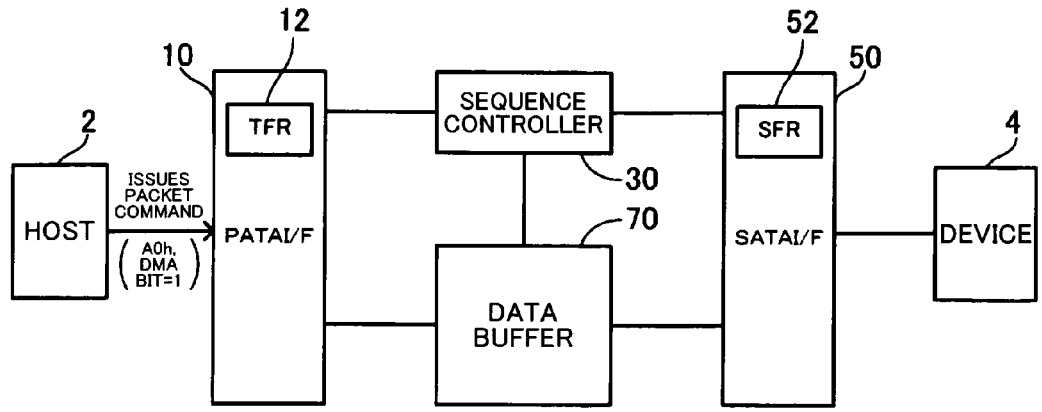
FIG. 16A to 16C are views illustrative of a method according to one embodiment of the invention.

As indicated by B1 in FIG. 11 and FIG. 16A, the host 2 issues an ATA packet command. When performing ATAPI DMA transfer, the command code (A1 in FIG. 10A) of the ATA packet command issued by the host 2 is set at A0h, and the DMA bit indicated by A2 is set at 1 (DMA setting).

When the ATA packet command has been issued, the data transfer control device (sequence controller) sets the ATA status register (Status in FIG. 7) of the task file register (TFR) 12 at D0h. Specifically, the data transfer control device (sequence controller) notifies the host 2 that the device 4 is in a busy state by setting the BUSY bit of the status register at 1 and clearing the DRQ (data request) bit to 0.

Figure 16B:
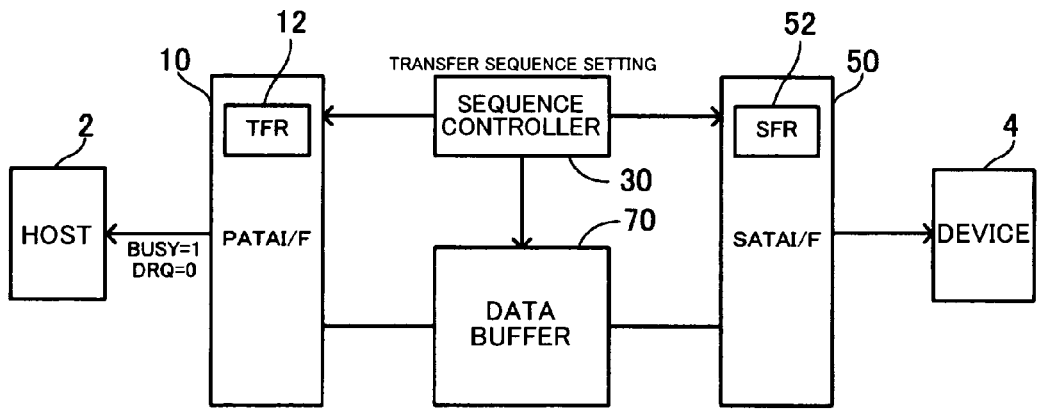

As indicated by B2 in FIG. 11 and FIG. 16B, the data transfer control device (sequence controller) performs a transfer sequence setting (e.g., transfer direction and transfer type). Specifically, the data transfer control device (sequence controller) performs a transfer sequence setting for data transfer through the PATA I/F 10. The data transfer control device (sequence controller) also performs a transfer sequence setting for data transfer through the data buffer 70.

Figure 16C:
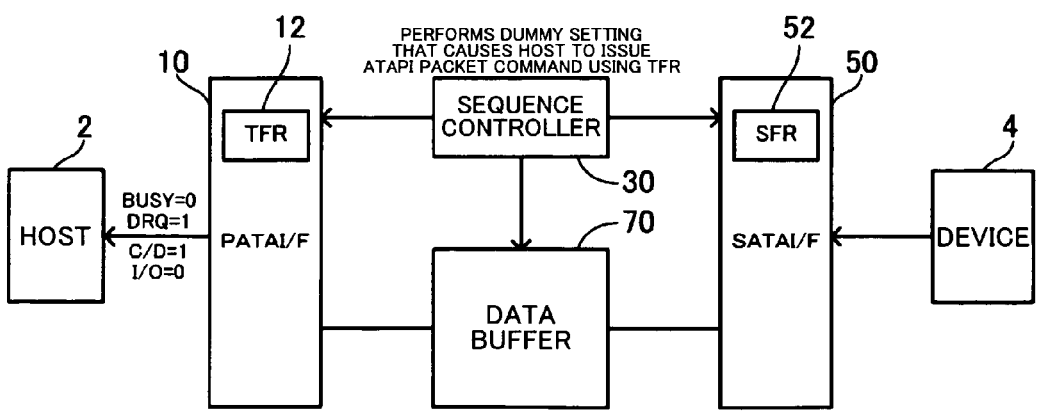

After the data transfer control device (sequence controller) has performed the transfer sequence setting, the data transfer control device (sequence controller) performs a dummy setting which causes the host 2 to issue an ATAPI packet command using the TFR 12 by setting the ATA status register of the TFR 12 at 58h, for example, as indicated by B3 in FIG. 11 and FIG. 16C. Specifically, the data transfer control device (sequence controller) sets the BUSY bit (A5 in FIG. 10B) at 0, sets the DRQ bit (A6) at 1, sets the C/D bit (A4) at 1, and sets the I/O bit (A3) at 0. The host 2 is thus notified that the device is not in a busy state, a packet command is requested, and the transfer direction is a direction from the host 2 to the device 4.

Specifically, the process can be performed as if the data transfer control device had transmitted a register FIS to the device 4, received a PIO setup FIS corresponding to the register FIS from the device 4, and set the TFR 12 (BUSY=0, DRQ=1, C/D=1, and I/O=0) based on the received PIO setup FIS. The dummy setting using the TFR 12 makes it possible to cause the host 2 to issue the ATAPI packet command before transmitting the register FIS to the device 4, decode the ATAPI packet command, and control the transfer sequence based on the decoding result.

Moreover, the PATA I/F 10 can receive the ATAPI packet command issued by the host 2 based on the dummy setting and the ATAPI packet command can be stored in the data buffer 70 and decoded by setting the transfer sequence of the PATA I/F 10 and the data buffer 70 before the dummy setting indicated by B3, as indicated by B2 in FIG. 11. This implements appropriate transfer sequence control relating to the ATAPI packet command issued based on the dummy setting.

Figure 17A:
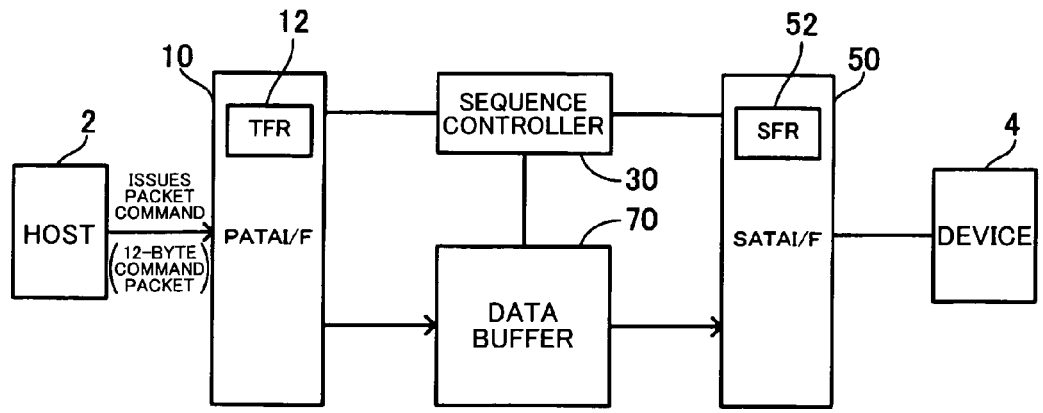
FIG. 17A to 17C are views illustrative of a method according to one embodiment of the invention.

When the dummy setting has been performed, the host 2 issues an ATAPI packet command of which a 12-byte packet command is set in the data register, as indicated by B4 in FIG. 11 and FIG. 17A. The data transfer control device (sequence controller) then sets the ATA status register of the TFR 12 at D0h. Specifically, the data transfer control device (sequence controller) sets the BUSY bit at 1 and clears the DRQ bit to 0.

Figure 17B:
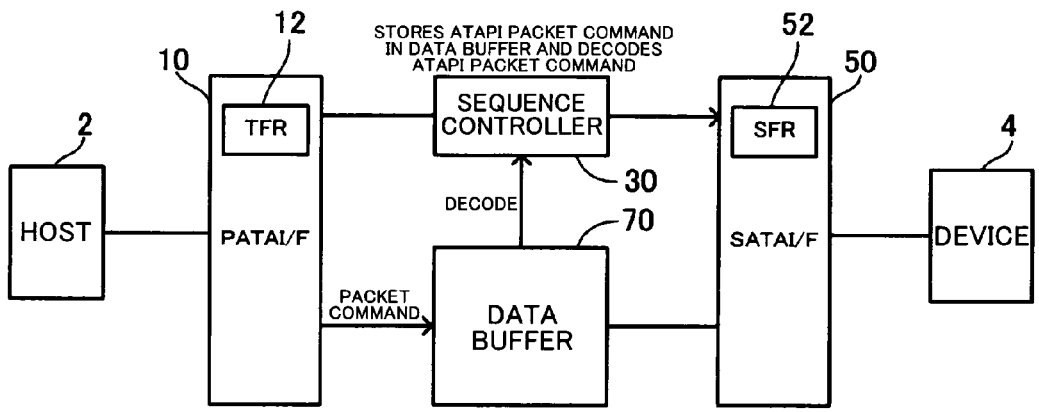

As indicated by B5 in FIG. 11 and FIG. 17B, the data transfer control device stores the issued ATAPI packet command in the data buffer 70, and decodes the ATAPI packet command. Specifically, the data transfer control device temporarily stores the ATAPI packet command in the data buffer 70 without outputting the ATAPI packet command to the SATA I/F 50, and decodes the ATAPI packet command.

Figure 17C:
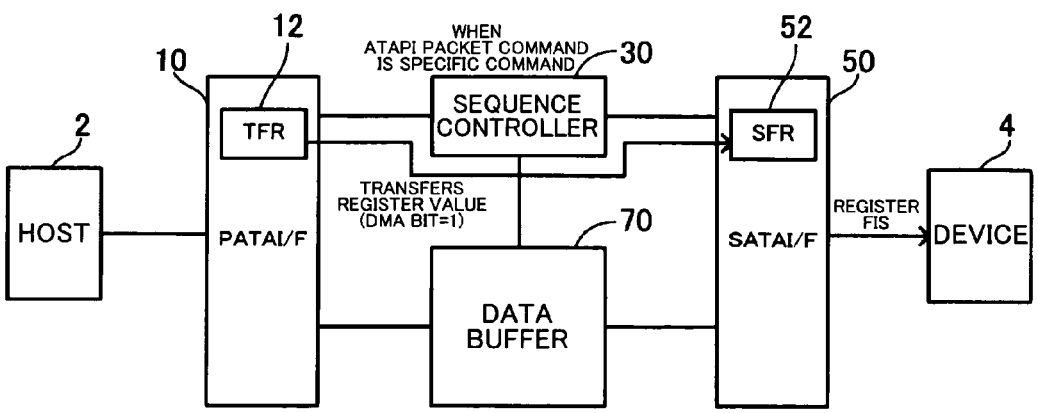

As indicated by B6 in FIG. 11 and FIG. 17C, when the data transfer control device has determined that the DMA bit of the ATA packet command is set at 1 and the ATAPI packet command is a specific command based on the decoding result, the data transfer control device performs a DMA transfer setting without changing the DMA bit from 1. Specifically, the data transfer control device transfers the register value in which the DMA bit indicates a DMA setting (=1) from the TFR 12 to the SFR 52. This causes the PATA I/F 10 and the SATA I/F 50 to perform DMA data transfer with the host 2 and the device 4, respectively.

Figure 18A:
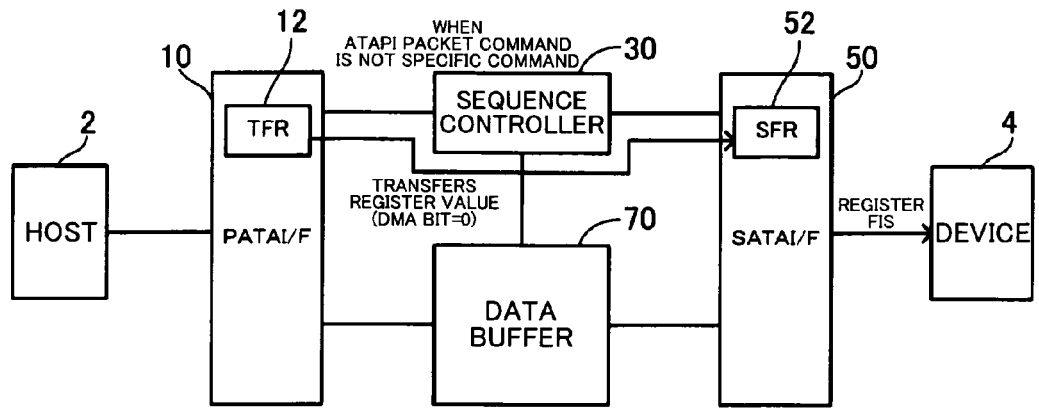
FIG. 18A to 18C are views illustrative of a method according to one embodiment of the invention.

As indicated by B6 in FIG. 11 and FIG. 18A, when the data transfer control device (sequence controller) has determined that the DMA bit of the ATA packet command is set at 1 and the ATAPI packet command is not a specific command based on the decoding result, the data transfer control device (sequence controller) rewrites the DMA bit by 0 (PIO setting). The data transfer control device transfers the register value in which the DMA bit is rewritten by a PIO setting from the TFR 12 to the SFR 52. Therefore, the PATA I/F 10 performs DMA data transfer with the host 2, and the SATA I/F 50 performs PIO data transfer with the device 4.

FIG. 22 shows examples of a specific command and examples of a command other than a specific command. Examples of a specific command include a READ10 command, a READ12 command, a READ CD command, a READ CD MSF command, a WRITE10 command, and a WRITE12 command. Examples of a command other than a specific command include a command for checking information relating to the device 4, a command for a purpose other than data transfer, and the like.

Figure 18B:
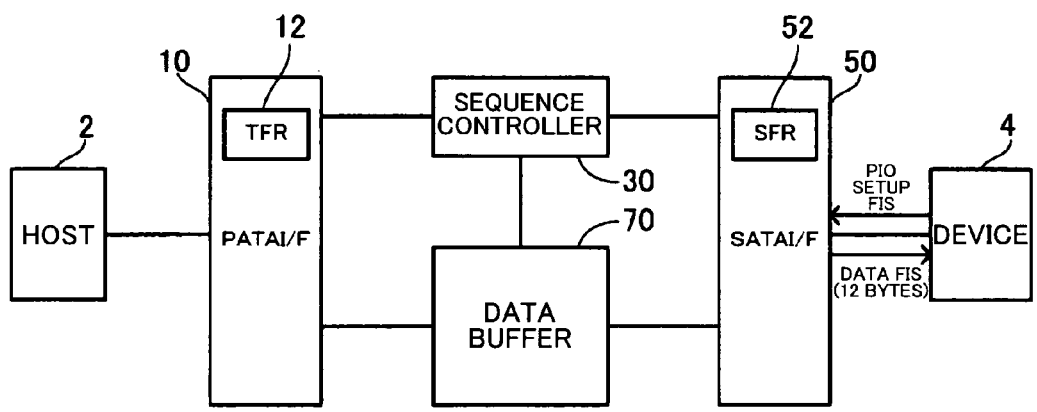
Figure 18C:
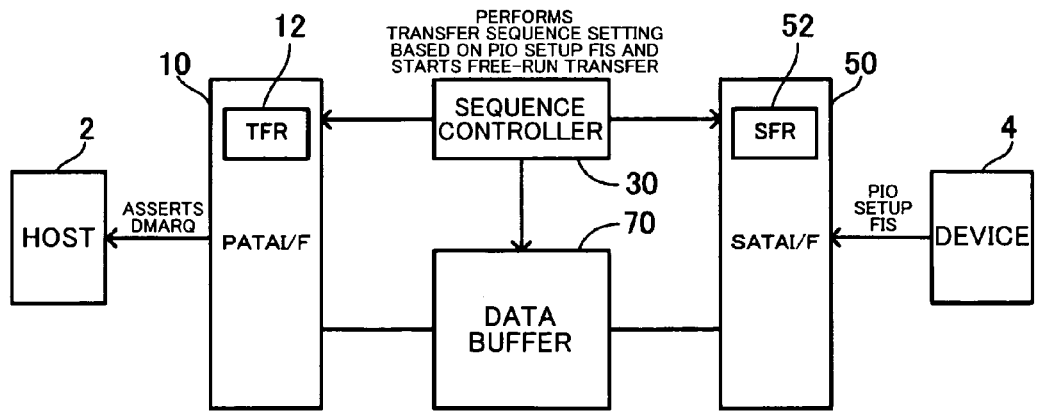

When the data transfer control device has transmitted the register FIS to the device 4 and received the PIO setup FIS corresponding to the register FIS from the device 4, as shown in FIG. 18B, the data transfer control device transmits the data FIS including the command packet of the ATAPI packet command to the device 4. When the device 4 has completed preparations, the device 4 issues and transmits an FIS which differs depending on the data transfer type to the data transfer control device.

Figure 12:
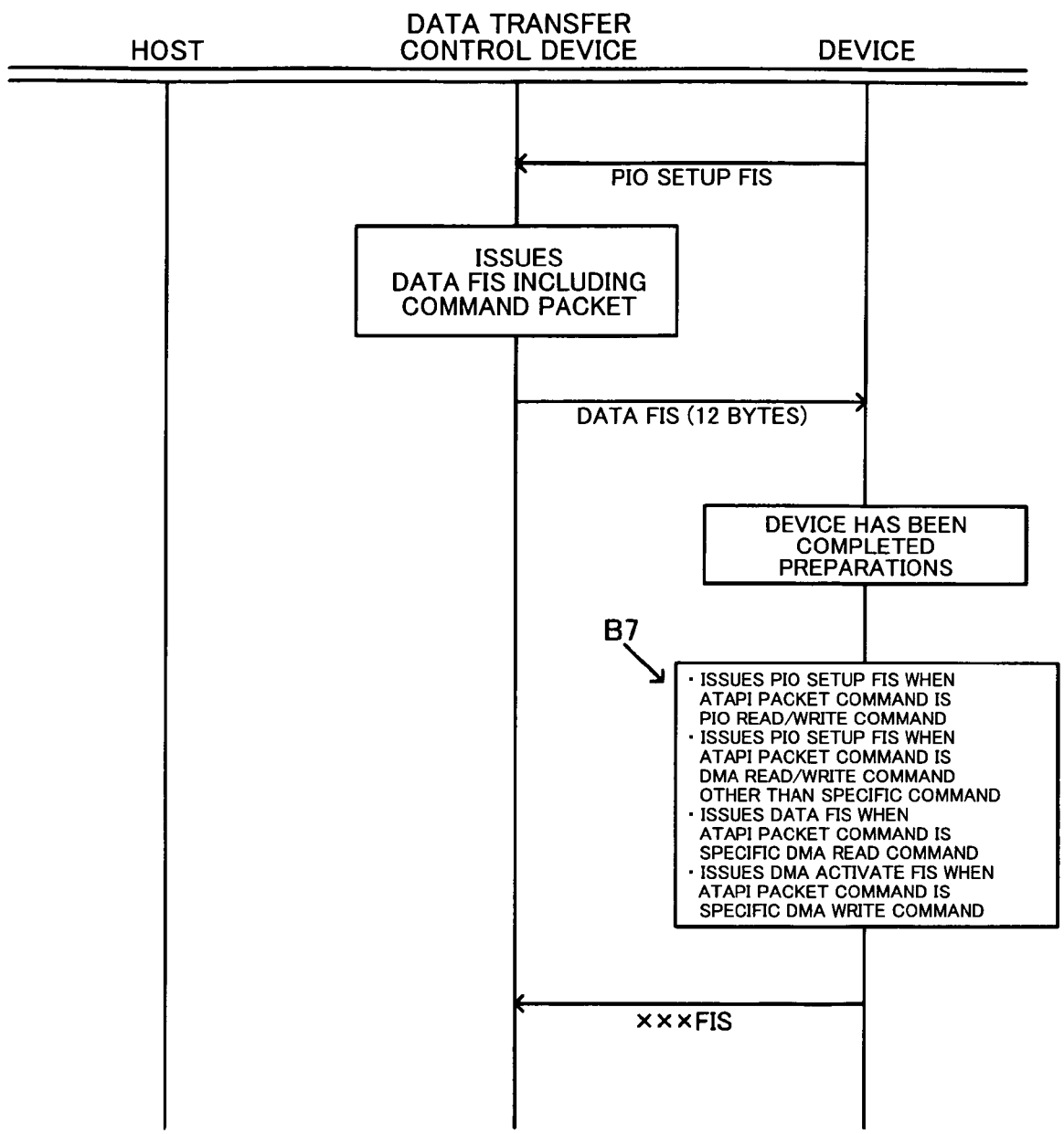
FIG. 12 is a transfer sequence diagram illustrative of a method according to one embodiment of the invention.

Specifically, the device 4 issues a PIO setup FIS when the ATAPI packet command is a PIO read or PIO write command, as indicated by B7 in FIG. 12. The device 4 also issues a PIO setup FIS when the ATAPI packet command is a DMA read or DMA write command other than a specific command. The device 4 issues a data FIS when the ATAPI packet command is a specific DMA read command (READ10, READ12, READ CD, or READ CD MSF). The device 4 issues a DMA activate FIS when the ATAPI packet command is a specific DMA write command (WRITE10 or WRITE12). When the data transfer control device (sequence controller) has received the FIS thus issued from the device 4, the data transfer control device performs transfer sequence control corresponding to the type of the received FIS.

Figure 13:
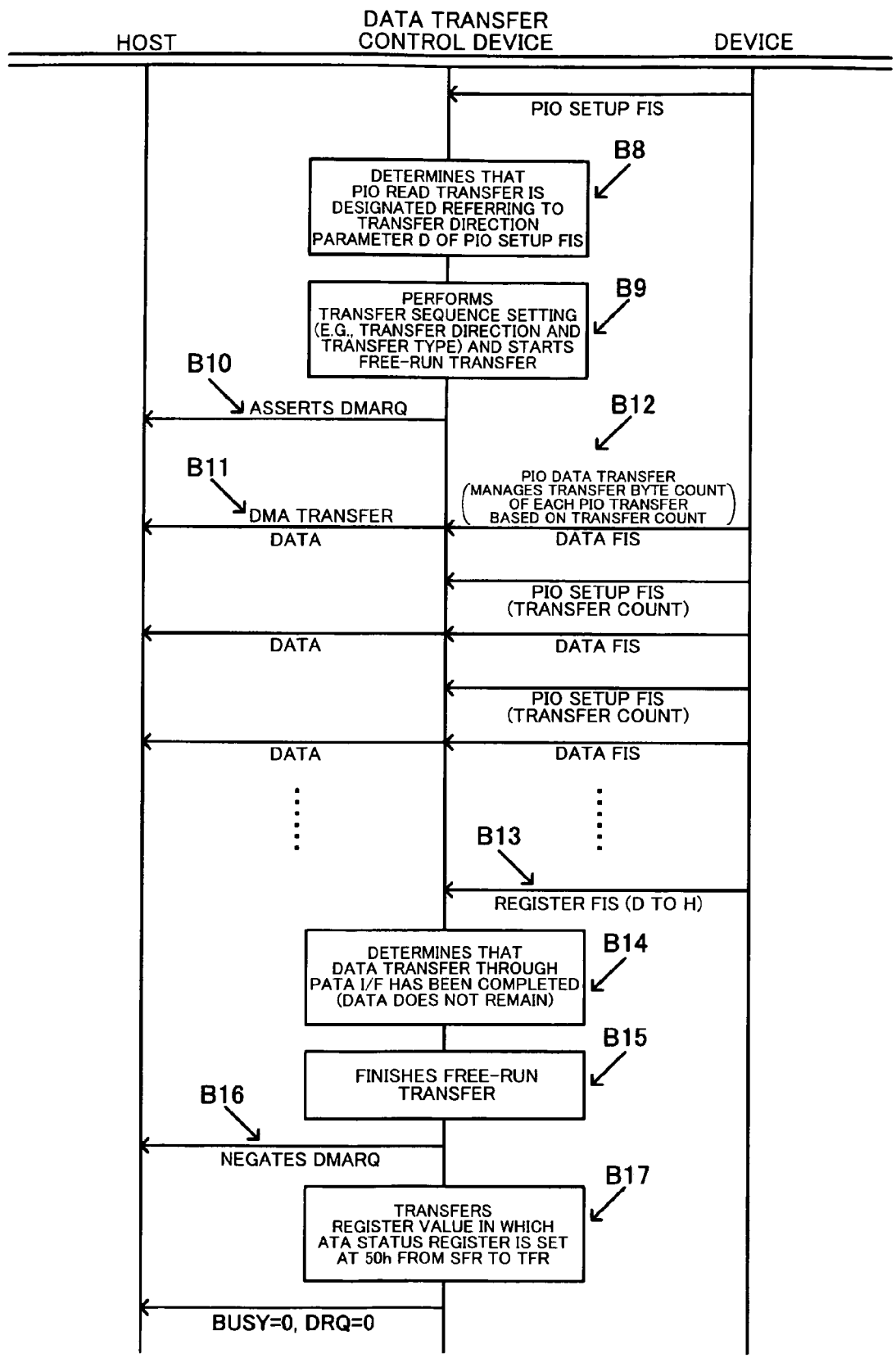
FIG. 13 is a transfer sequence diagram when an ATAPI packet command is a DMA read command other than a specific command.

FIG. 13 is a transfer sequence diagram when the ATAPI packet command is a DMA read command other than a specific command and the data transfer control device has received a PIO setup FIS from the device 4 at B7 in FIG. 12.

When the data transfer control device has received a PIO setup FIS, the data transfer control device determines that PIO read transfer (i.e., the transfer direction is read, and the transfer type is PIO) is designated referring to the transfer direction parameter D of the PIO setup FIS (FIG. 8C), as indicated by B8 in FIG. 13. As indicated by B8 in FIG. 13 and FIG. 18C, the data transfer control device performs a transfer sequence setting (e.g., transfer direction and transfer type), and starts free-run transfer.

In this embodiment, when the ATAPI packet command has been issued and the SATA I/F 50 transmitted a data FIS including a command packet to the device 4 and received a PIO setup FIS from the device 4, the data transfer control device (sequence controller) starts free-run transfer that does not manage the total data transfer count. Specifically, the sequence controller 30 activates a transfer start signal (Tran Go), and then starts free-run transfer in which the total data transfer count (total sector count or DMA transfer count) is not counted. The sequence controller 30 activates a transfer stop signal (Tran Stop) when finishing free-run transfer.

When free-run transfer has started, the data transfer control device (PATA I/F) asserts a signal DMARQ, as indicated by B10 in FIG. 13. Specifically, the data transfer control device performs normal DMA data transfer with the host 2 (B11 in FIG. 13 and FIG. 19A) using a DMA transfer signal having a signal waveform shown in FIG. 4A.

Figure 19A:
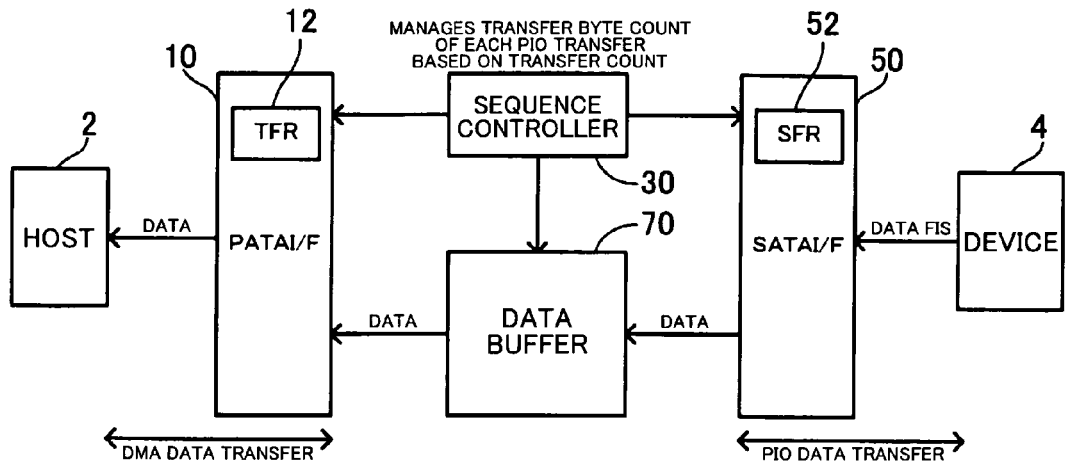
FIG. 19A to 19C are views illustrative of a method according to one embodiment of the invention.

The data transfer control device performs PIO data transfer using a PIO setup FIS and a data FIS with the device 4, as indicated by B12 in FIG. 13 and FIG. 19A.

During free-run transfer indicated by B11 and B12 in FIG. 13, the sequence controller 30 does not manage the total data transfer count, but manages the transfer byte count of each PIO transfer (PIO transfer unit) based on the transfer count (Transfer Count in FIG. 8C) set in the PIO setup FIS received from the device 4. This enables appropriate data transfer to be implemented even when using the free-run transfer method which does not manage the total data transfer count.

Figure 19B:
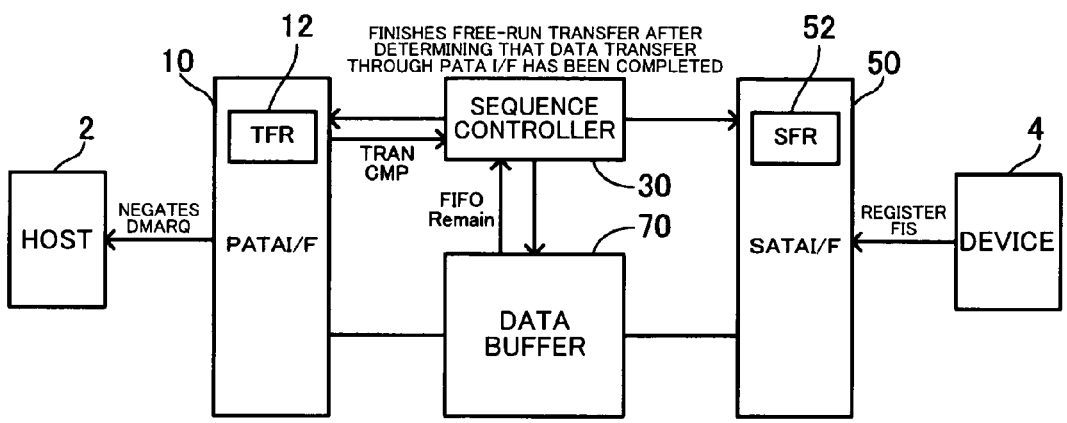
Figure 19C:
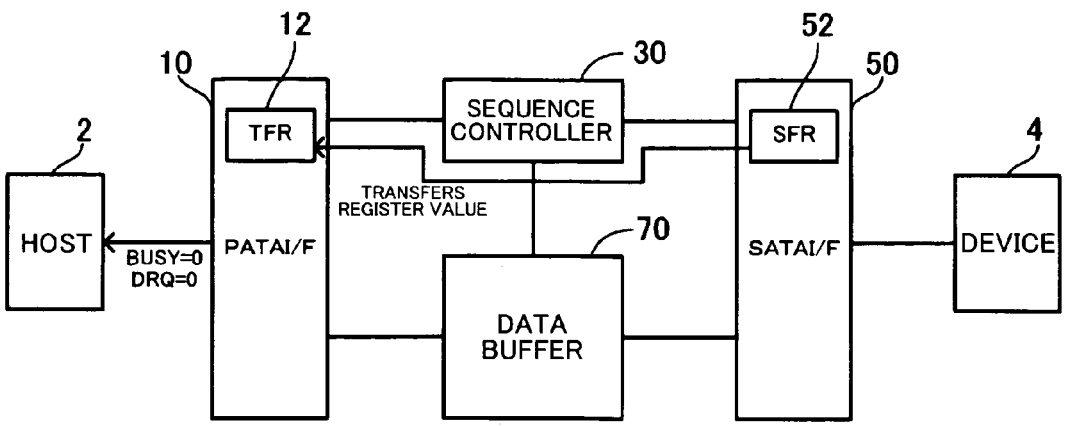

The sequence controller 30 finishes free-run transfer when the sequence controller 30 has received a register FIS from the device 4 after free-run transfer has started, as indicated by B13, B14, and B15 in FIG. 13 and FIG. 19B. Specifically, when the transfer direction is a direction (DMA read) in which the host 2 reads data from the device 4, the sequence controller 30 finishes free-run transfer after the sequence controller 30 has received a register FIS from the device 4 (B1) and determined that data transfer using the PATA I/F 10 has been completed (B14). For example, the sequence controller 30 finishes free-run transfer when the sequence controller 30 has determined that data does not remain in the data buffer 70 (i.e., FIFO empty) using a signal FIFORemain from the data buffer 70, and has determined that data transfer using the PATA I/F 10 has been completed using a transfer completion interrupt signal TRANCMP from the PATA I/F 10, as shown in FIG. 19B. Specifically, the sequence controller 30 finishes free-run transfer when the sequence controller 30 has determined that data does not remain in a FIFO of the data buffer 70 and a FIFO in the PATA I/F 10.

In the case of DMA write free-run transfer, the sequence controller 30 finishes free-run transfer when the sequence controller 30 has received a register FIS from the device 4. In the case of DMA read free-run transfer, the sequence controller 30 finishes free-run transfer when the sequence controller 30 has received a register FIS and determined that data has been completely output to the PATA bus. For example, the PATA I/F 10 outputs the transfer completion interrupt signal TRANCMP to the sequence controller 30 when data transfer has been completed, and the sequence controller 30 outputs a transfer stop signal to finish free-run transfer. This enables the host 2 to appropriately read data by DMA transfer.

When DMA data transfer through the PATA I/F 10 and PIO data transfer through the SATA I/F 50 have completed and free-run transfer has finished, the PATA I/F 10 negates the signal DMARQ, as indicated by B16 in FIG. 13. The sequence controller 30 transfers the register value in which the ATA status register is set at 50h from the SFR 52 to the TFR 12, as indicated by B17 in FIG. 13 and FIG. 19C. Specifically, the sequence controller 30 transfers the register value in which the BUSY bit and the DRQ bit are cleared to 0 from the SFR 52 to the TFR 12. This allows the host 2 to be notified that the device 4 is not in a busy state.

In this embodiment, when the transfer byte count of PIO data transfer with the device 4 is less than the SATA data transfer unit byte count (e.g., four bytes) and SATA I/F 50 has received dummy data from the device 4, the SATA I/F 50 masks output of the dummy data to the PATA I/F 10 (data buffer 70).

In FIGS. 20A to 20E, data transfer in which the total data transfer byte count is 128×4+1=513 bytes is performed, for example. 513 bytes cannot be divided by four bytes as the SATA data transfer unit (minimum data transfer byte count).

In FIGS. 20A to 20D, the device 4 transmits 128-byte data to the SATA I/F 50 using a data FIS, and the SATA I/F 50 outputs the received 128-byte data to the data buffer 100.

Figure 20A:
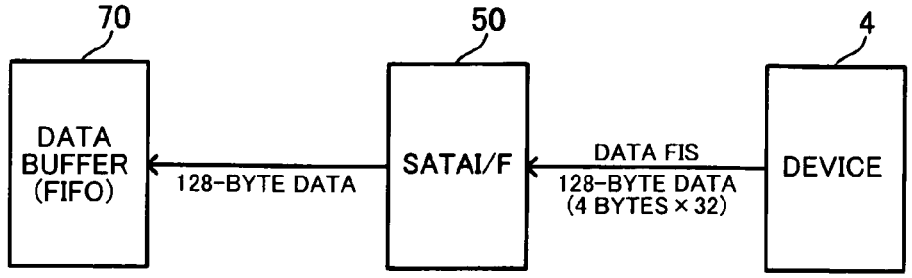
FIG. 20A to 20E are views illustrative of a method of masking output of dummy data.
Figure 20B:
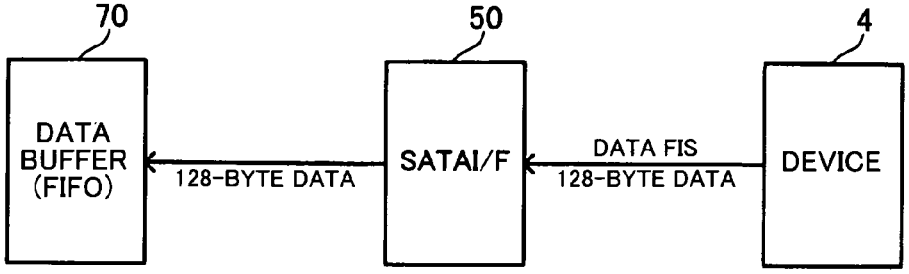
Figure 20C:
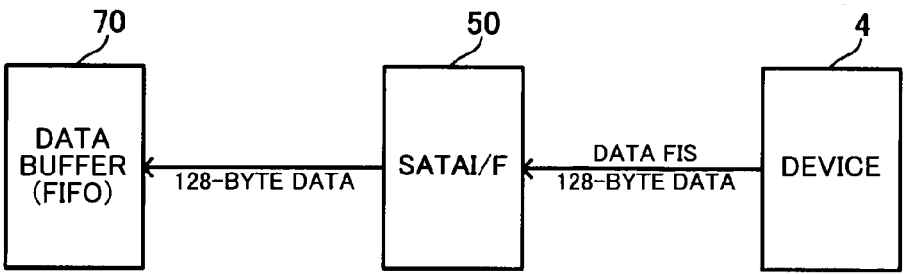
Figure 20D:
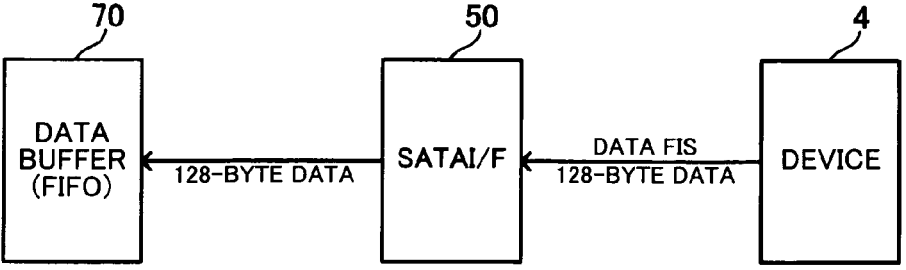
Figure 20E:
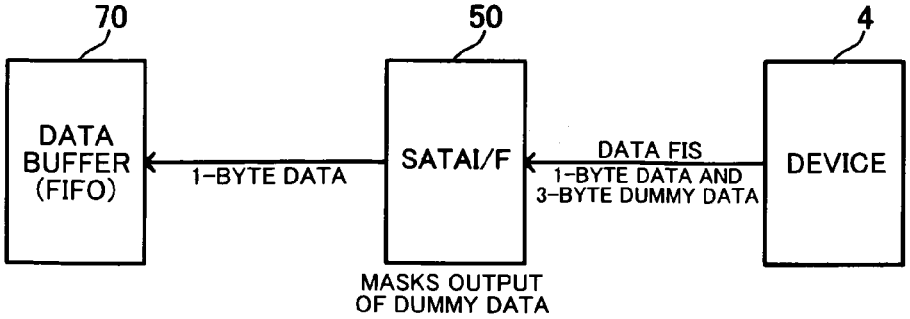

In FIG. 20E, the device 4 pads the last one-byte data with three-byte dummy data, and transmits the resulting data to the SATA I/F 50. In this case, the SATA I/F 50 outputs only the last one-byte data to the data buffer 70, and masks output of the three-byte dummy data. This prevents a situation in which the dummy data is transferred to the host 2 so that the host 2 malfunctions, for example.

Figure 14:
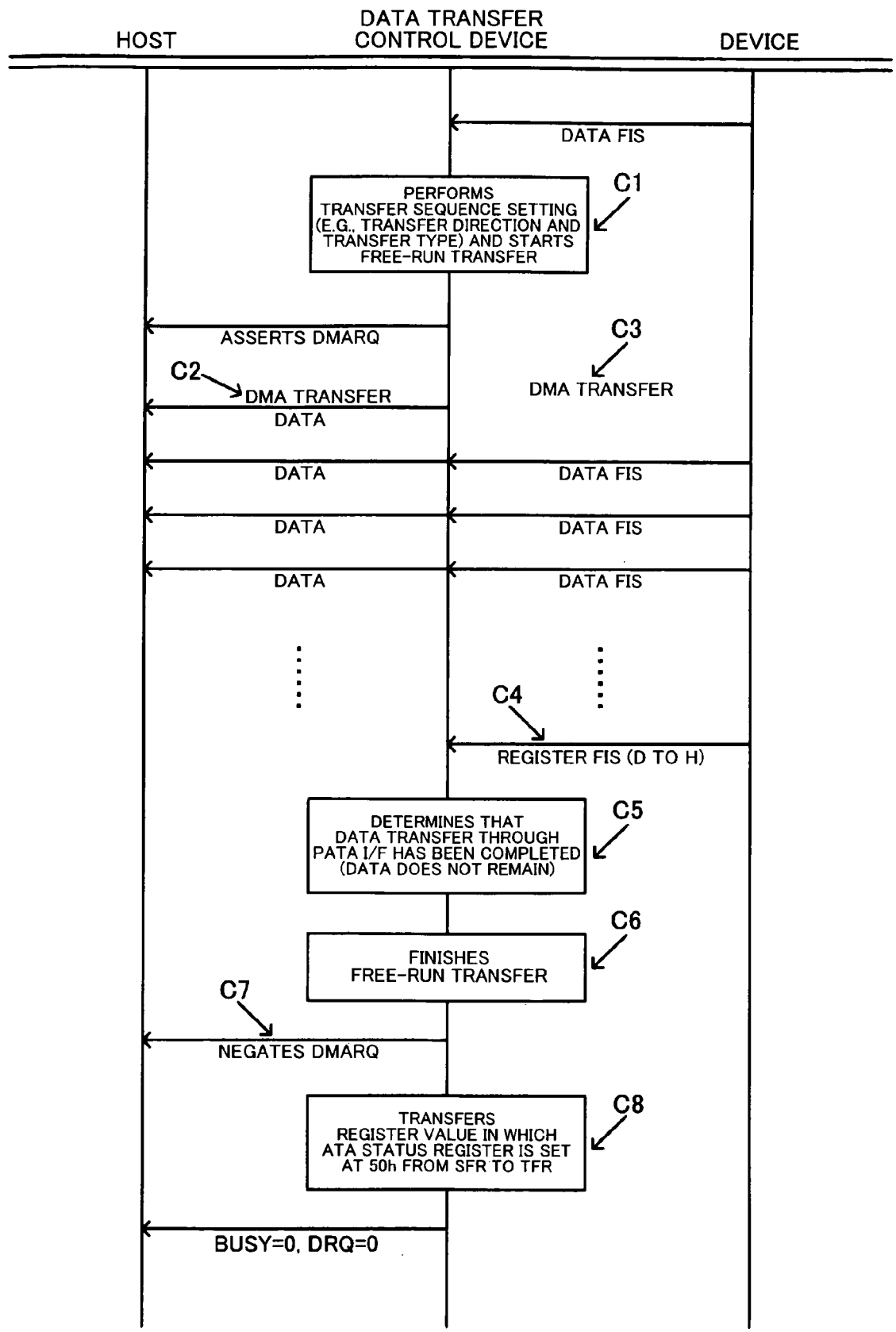
FIG. 14 is a transfer sequence diagram when an ATAPI packet command is a specific DMA read command.

FIG. 14 is a transfer sequence diagram when the ATAPI packet command is a specific DMA read command (READ10, READ12, READ CD, or READ CD MSF) and the data transfer control device has received a data FIS from the device 4 at B7 in FIG. 12.

When the data transfer control device has received a data FIS, the data transfer control device determines that it should set a DMA read transfer sequence. The data transfer control device then performs a DMA read transfer sequence setting (e.g., transfer direction (read direction) and transfer type (DMA)), and starts free-run transfer, as indicated by C1 in FIG. 14 and FIG. 21A.

Figure 21A:
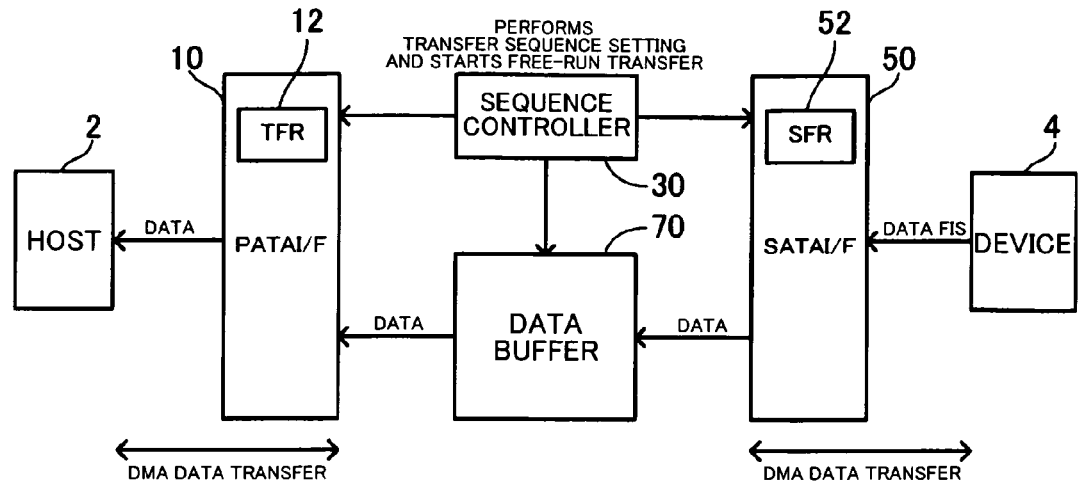
FIG. 21A to 21C are views illustrative of a method according to one embodiment of the invention.

After free-run transfer has started, the data transfer control device asserts the signal DMARQ, and performs DMA read data transfer with the host 2 and the device 4, as indicated by C2 and C3 in FIG. 14 and FIG. 21A. Specifically, the data transfer control device performs DMA transfer using a signal having the signal waveform shown in FIG. 4A with the host 2, and performs DMA transfer using a data FIS with the device 4.

Figure 21B:
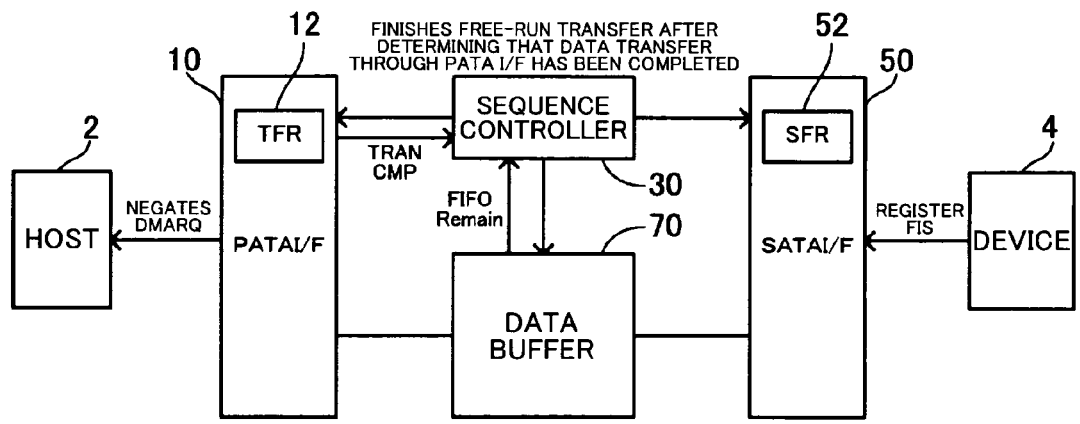

The data transfer control device finishes free-run transfer when the data transfer control device has received a register FIS from the device 4 after free-run transfer has started, as indicated by C4, C5, and C6 in FIG. 14. Specifically, the data transfer control device finishes free-run transfer when data transfer through the PATA I/F 10 has been completed, as indicated by C5. For example, the data transfer control device finishes free-run transfer when the data transfer control device has determined that data does not remain in the data buffer 70 using the signal FIFORemain from the data buffer 70, and has determined that data transfer through the PATA I/F 10 has been completed using the transfer completion interrupt signal TRANCMP from the PATA I/F 10, as shown in FIG. 21B.

When free-run transfer has finished, the PATA I/F 10 negates the signal DMARQ, as indicated by C7 in FIG. 14. The sequence controller 30 transfers the register value in which the ATA status register is set at 50h from the SFR 52 to the TFR 12, as indicated by C8. Specifically, the sequence controller 30 transfers the register value in which the BUSY bit and the DRQ bit are cleared to 0 from the SFR 52 to the TFR 12 to notify the host 2 that the busy state has been canceled.

Figure 15:
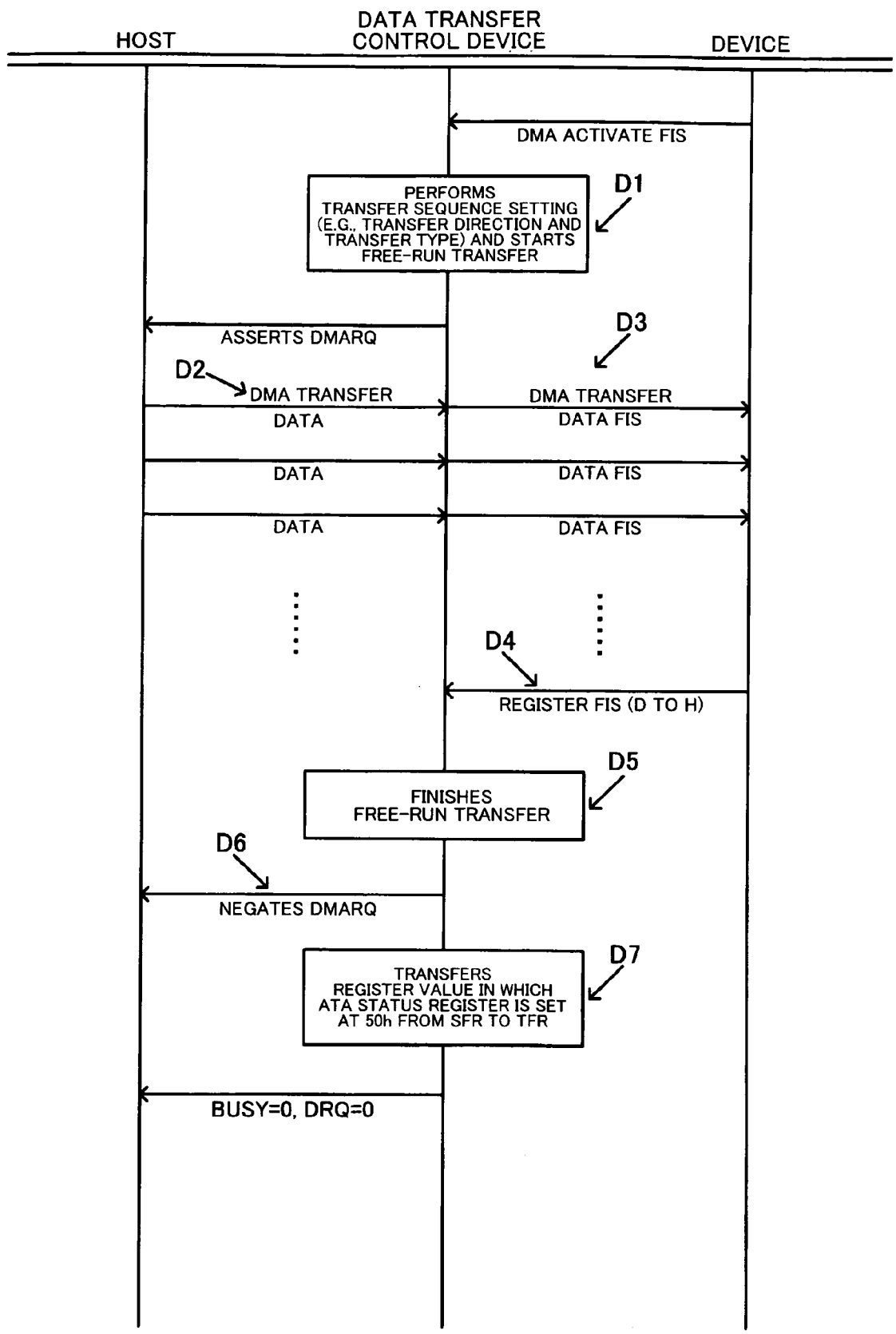
FIG. 15 is a transfer sequence diagram when an ATAPI packet command is a specific DMA write command.

FIG. 15 is a transfer sequence diagram when the ATAPI packet command is a specific DMA write command (WRITE10 or WRITE12) and the data transfer control device has received a DMA activate FIS from the device 4 at B7 in FIG. 12.

When the data transfer control device has received a DMA activate FIS, the data transfer control device determines that it should set a DMA write transfer sequence. The data transfer control device then performs a DMA write transfer sequence setting (e.g., transfer direction (write direction) and transfer type (DMA)), and starts free-run transfer.

Figure 21C:
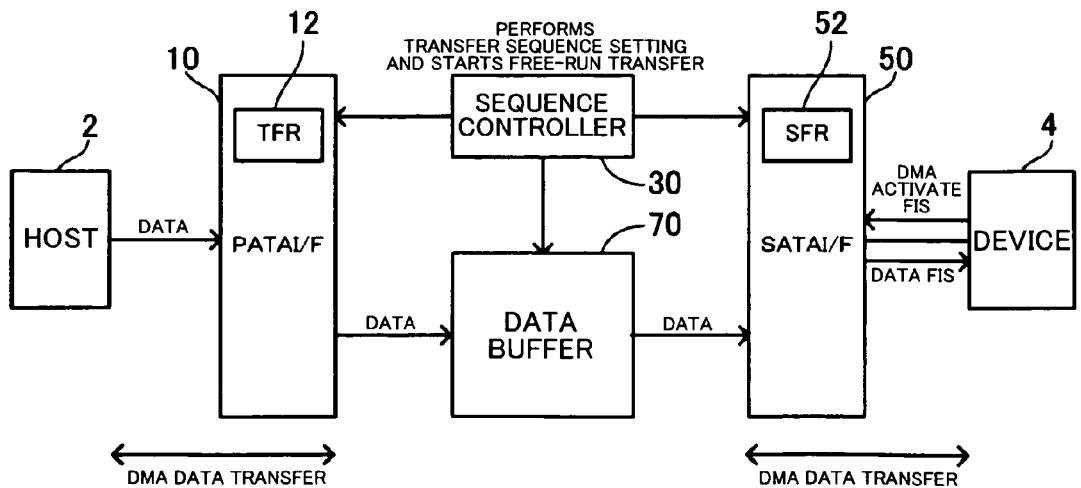

After free-run transfer has started, the data transfer control device asserts the signal DMARQ, and performs DMA write data transfer with the host 2 and the device 4, as indicated by D2 and D3 in FIG. 15 and FIG. 21C.

The data transfer control device finishes free-run transfer when the data transfer control device has received a register FIS from the device 4 after free-run transfer has started, as indicated by D4 and D5 in FIG. 15. Specifically, the data transfer control device finishes DMA write free-run transfer without determining whether or not data transfer through the PATA I/F 10 has been completed (C5 in FIG. 14).

When free-run transfer has finished, the PATA I/F 10 negates the signal DMARQ, as indicated by D6 in FIG. 15. The sequence controller 30 transfers the register value in which the ATA status register is set at 50h from the SFR 52 to the TFR 12 to notify the host 2 that the busy state has been canceled, as indicated by D7.

According to this embodiment, when the data transfer control device has determined that the ATAPI packet command is a specific command based on the decoding result, the PATA I/F 10 and the SATA I/F 50 perform DMA data transfer with the host 2 and the device 4, respectively, as indicated by C2 and C3 in FIG. 14 and D2 and D3 in FIG. 15. According to this configuration, since the PATA side and the SATA side perform DMA data transfer when the ATAPI packet command is a specific command (READ10, READ12, READ CD, READ CD MSF, WRITE10, or WRITE12) with a large transfer byte count, the data transfer efficiency can be improved so that a decrease in data transfer rate can be prevented.

When the data transfer control device has determined that the ATA packet command is not a specific command based on the decoding result, the PATA I/F 10 performs DMA data transfer with the host 2 while the SATA I/F 50 performs PIO data transfer with the device 4, as indicated by B11 and B12 in FIG. 13. Specifically, the SATA side is necessarily set in the PIO transfer mode when the ATA packet command is not a specific command. This prevents a situation in which dummy data added due to padding is transferred to the host 2 even when the transfer byte count cannot be divided by four bytes as the SATA-side transfer byte count, whereby an appropriate data transfer can be implemented.

According to this embodiment, the subsequent data transfer sequence control differs depending on whether or not the ATAPI packet command is a specific command. It is necessary to cause the host 2 to issue an ATAPI packet command in order to determine whether or not the ATAPI packet command is a specific command. In this embodiment, a dummy setting indicated by B3 in FIG. 11 is performed using the TFR 12.

As a comparative example of this embodiment, when the host 2 has issued an ATA packet command (A0h), a register FIS may be transmitted to the device 4 without performing a dummy setting indicated by B3 in FIG. 11.

According to the comparative example method, it is necessary to fix the DMA bit of the Features register (see FIG. 8A) of the register FIS when transmitting the register FIS to the device 4. This makes it impossible to implement the method which allows the DMA bit to remain unchanged at 1 when the ATAPI packet command is a specific command and rewrites the DMA bit by 0 when the ATAPI packet command is not a specific command, as indicated by B6 in FIG. 11.

According to this embodiment, when the host 2 has issued an ATA packet command (A0h), the data transfer control device suspends transmission of a register FIS to the device 4, and causes the host 2 to issue an ATAPI packet command by performing a dummy setting indicated by B3 in FIG. 1.

This makes it possible to allow the DMA bit to remain unchanged at 1 when the ATAPI packet command is a specific command and rewrite the DMA bit by 0 when the ATAPI packet command is not a specific command, as indicated by B6 in FIG. 11, whereby a register FIS corresponding to the ATA packet command can be transmitted to the device 4. Specifically, the register FIS can be transmitted to the device 4 after reflecting whether or not the ATAPI packet command is a specific command in the Features register. Therefore, the subsequent data transfer sequence can be controlled correspondingly to whether or not the ATAPI packet command is a specific command, as indicated by B11 and B12 in FIG. 13, C2 and C3 in FIG. 14, and D2 and D3 in FIG. 15, whereby a decrease in data transfer rate can be prevented while implementing appropriate data transfer.

7. Free-Run Transfer

The transfer byte count of each sector and the total sector count (sector count) are set for ATA PIO transfer, and PIO transfer is finished when sectors in a number set by the total sector count have been transferred. The DMA transfer count (DMA data transfer size) is set for DMA transfer, and DMA transfer is finished when data corresponding to the DMA transfer count has been transferred. Therefore, a count circuit that counts the total data transfer count such as the total sector count or the DMA transfer count is required in order to perform PIO transfer or DMA transfer.

On the other hand, the circuit scale of the data transfer control device is necessarily increased by providing such a count circuit. Moreover, since it is necessary to control the operation (e.g., pointer control) of the count circuit, the circuit and the process of the data transfer control device become complicated.

In order to solve such a problem, the free-run transfer method which does not manage the total data transfer count is employed in FIGS. 18 C, 21A, and 21C. Specifically, the sequence controller 30 activates the transfer start signal (Tran Go), and then starts free-run transfer in which the total data transfer count (total sector count or DMA transfer count) is not counted. The sequence controller 30 activates the transfer stop signal (Tran Stop) when finishing free-run transfer.

Since a circuit which counts the total data transfer count becomes unnecessary by performing free-run transfer, the circuit scale of the data transfer control device can be reduced. Moreover, since it is unnecessary to control the operation (e.g., pointer control) of a count circuit, the circuit and the process of the data transfer control device can be simplified.

In this case, since the total data transfer count is not counted during free-run transfer, whether or not to finish free-run transfer cannot be determined.

In FIGS. 19B and 21B, the data transfer control device finishes free-run transfer when the data transfer control device has determined that an FIS received from the device 4 after free-run transfer has started is an FIS which indicates completion of all data transfers. Specifically, the data transfer control device determines that free-run transfer has been completed when the data transfer control device has received a register FIS from the device 4 after free-run transfer has started. This makes it possible to determine completion of free-run transfer without counting the total data transfer count, whereby appropriate data transfer control can be implemented while reducing the circuit scale of the data transfer control device.

The data transfer control device having a bridge function must perform transfer sequence control corresponding to a command (ATA or ATAPI command) issued by the host 2. The data transfer control device must decode the command in order to determine the information relating to transfer sequence control. This makes it necessary to provide a command decoder and a parameter table. Specifically, the data transfer control device decodes the command issued by the host 2, determines the transfer direction (read or write) and the transfer type (PIO or DMA), and determines the internal transfer sequence.

However, the circuit scale of the logic circuit and the memory capacity of the data transfer control device increase when providing such a command decoder. In order to decode the command, a decoding command table must be provided in the data transfer control device. However, when a new command is added to the standard after development of the data transfer control device has been completed, it is impossible to support such a new command without changing the circuit of the data transfer control device. Taking the ATAPI standard as an example, it is necessary to change a parameter table when a new standard optical disk drive such as a blue-ray disk drive is added to the ATAPI standard. This makes it impossible to use a data transfer control device which has been fully developed and makes it necessary to change its circuit in order to change a parameter table (table memory), thereby resulting in an additional development period and development cost. It is also difficult to deal with a special command specific to a vendor.

In this case, it is possible to deal with a situation in which a new command is added or the existing command is changed by incorporating a CPU (processing section) in a data transfer control device and changing a parameter table by revising firmware or the like.

On the other hand, when incorporating a CPU in a data transfer control device, it is necessary to develop firmware which operates on the CPU or develop a debug tool for checking the operation of the CPU, whereby the development period and cost increase.

In order to solve such a problem, a command issued by the host 2 is transferred to the device 4 without decoding the command, as shown in FIG. 16A and the like. A transfer sequence relating to the issued command is controlled based on information relating to an FIS returned from the device. Specifically, the SATA device 4 decodes the command instead of the data transfer control device. The data transfer control device directly transfers the command to the device 4 without decoding the command (the data transfer control device may partially decode the command), and determines and executes the transfer sequence depending on the reaction of the SATA device. This makes it possible to reduce the circuit scale and the development period of the data transfer control device.

The SATA data transfer unit is four bytes. In the ATAPI standard, data which cannot be divided by four bytes can be designated as the payload. Therefore, when the data transfer byte count cannot be divided by four bytes, the device 4 performs the padding process with dummy data described with reference to FIG. 20E.

In FIGS. 18C to 19B and the like, the data transfer control device finishes free-run transfer by determining the type of FIS received from the device 4 after free-run transfer has started.

When performing PIO free-run transfer that does not manage the total data transfer count, the transfer byte count of each PIO transfer can be managed based on the transfer count parameter included in a PIO setup FIS. Therefore, a situation in which unnecessary dummy data is transferred to the host 2 can be prevented by managing the transfer byte count of each PIO transfer.

On the other hand, since a PIO setup FIS is not transmitted from the device 4 during DMA transfer, the transfer byte count of each DMA transfer cannot be managed. Therefore, since data including dummy data is transferred, unnecessary dummy data may be transferred to the host 2 during free-run transfer that does not manage the total data transfer count. Specifically, since the actual data transfer byte count differs from the data transfer byte count designated by the host 2, malfunction or the like may occur.

In FIG. 19A, the PATA side is set in the DMA transfer mode and the SATA side is set in the PIO transfer mode during DMA free-run transfer.

This makes it possible to manage the transfer byte count of each SATA-side PIO transfer during DMA transfer by utilizing the transfer count of the PIO setup FIS. Therefore, dummy data is not transferred to the host 2 by causing the SATA I/F 50 to mask output of unnecessary dummy data, as shown in FIG. 20E, for example. Therefore, even when using the free-run transfer method during ATAPI data transfer, the actual data transfer byte count coincides with the data transfer byte count designated by the host 2, whereby malfunction or the like can be prevented.

In FIG. 18A, the SATA side is set in the PIO transfer mode by transferring the register value in which the DMA bit is changed from 1 to 0 from the TFR 12 to the SFR 52. This makes it possible to cause the PATA I/F 10 to perform DMA transfer using the signal waveform shown in FIG. 4A and cause the SATA I/F 50 to perform PIO transfer using a PIO setup FIS and a data FIS although DMA transfer is actually performed.

FIG. 13 shows the transfer sequence when the ATAPI packet command is a DMA read command other than a specific command. When the ATAPI packet command is a DMA write command, the data transfer control device determines that PIO write transfer is designated referring to the transfer direction parameter D of the PIO setup FIS from the device 4 at B8 in FIG. 13, and performs a PIO write transfer sequence setting at B9. The data transfer control device receives data from the host 2 via DMA transfer at B11, and transmits the data to the device 4 via PIO transfer using a data FIS at B12. When the data transfer control device has received a register FIS from the device 4 at B13, the data transfer control device finishes free-run transfer at B15 without performing the process indicated by B14, and then perform the process indicated by B16 and 17.

8. Configuration of SATA I/F

Figure 23:
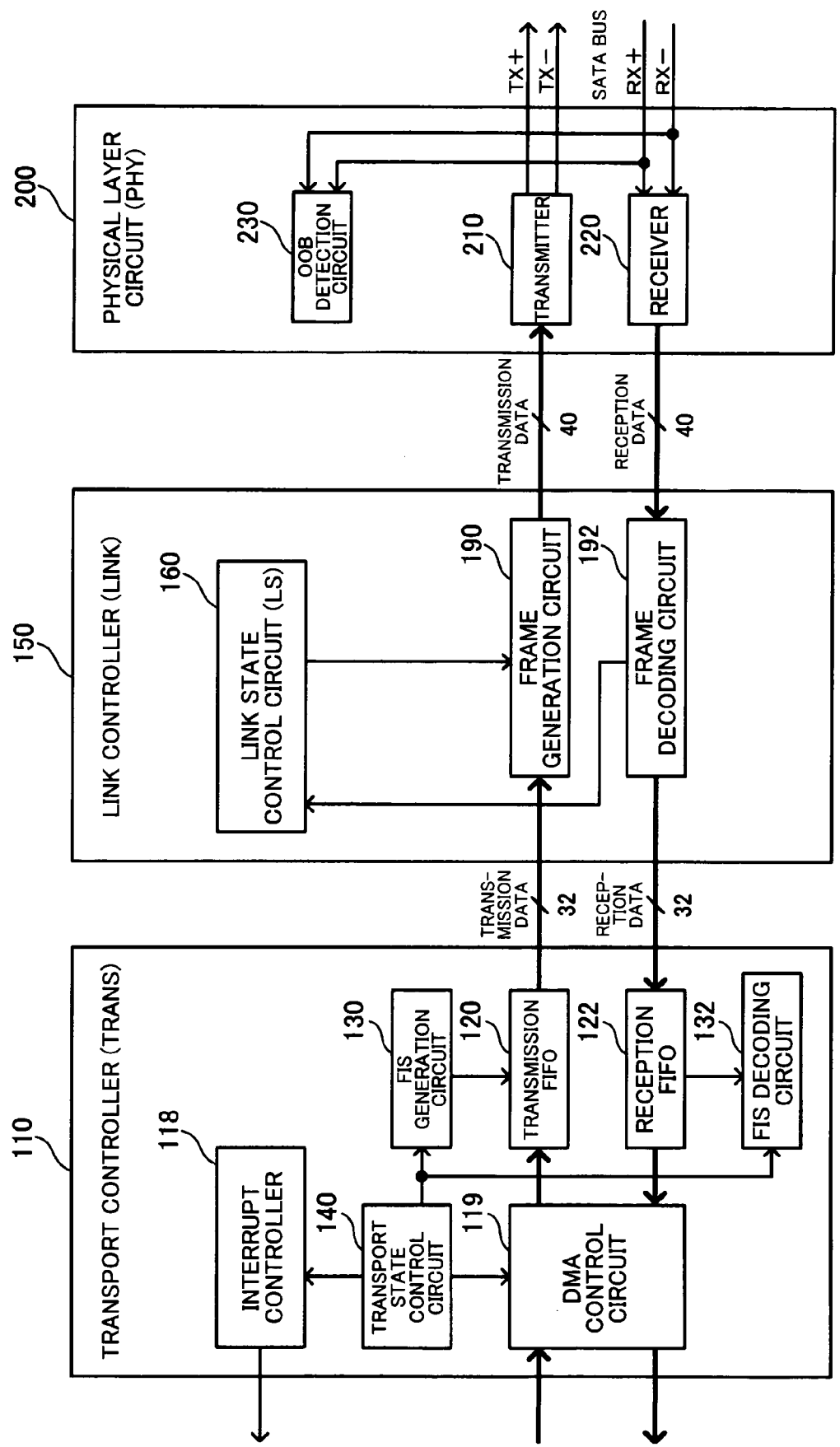
FIG. 23 shows a configuration example of an SATA I/F.

FIG. 23 shows a configuration example of the SATA I/F 50. Note that the configuration of the SATA I/F 50 is not limited to the configuration shown in FIG. 23. Various modification may be made such as omitting some elements or adding other elements. For example, the SATA I/F 50 may have a configuration in which the physical layer circuit 200 is omitted.

In the SATA standard, data is processed in 32 bit units. The link controller 150 8b/10b-encodes 32-bit data into 40-bit data, and transmits the 40-bit data to the physical layer circuit 200. The physical layer circuit 200 serializes the 40-bit data, and transmits the serialized data to a SATA cable. When receiving data, the physical layer circuit 200 converts serial data into 40-bit data, and the link controller 150 converts the 40-bit data into 32-bit data, and transmits the 32-bit data to the transport controller 110.

The transport controller 110 performs control of the transport layer. Specifically, the transport controller 110 performs the following process when receiving an FIS transmission request from the upper-level layer (application layer).

Specifically, the transport controller 110 collects the information of the FIS based on the FIS type requirement. The transport controller 110 disposes information to be transmitted in a defined format in FIS type units. The transport controller 110 then notifies the link controller 150 of the transmission request. This causes the link controller 150 to transmit a signal X_RDY. When the transport controller 110 has received a signal R_RDY from the partner node and received a reception acknowledgement from the link controller 150, the transport controller 110 transfers the FIS to the link controller 150. The transport controller 110 manages the flow of a transmission FIFO 120, and notifies the link controller 150 of necessary flow control. When the transport controller 110 has received the transmission result from the link controller 150, the transport controller 110 notifies the upper-level layer of the transmission result, if necessary.

The transport controller 110 performs the following process when the transport controller 110 has received an FIS from the link controller 150.

When the transport controller 110 has received an FIS from the link controller 150, the transport controller 110 determines the type of the received FIS. The transport controller 110 transfers data to a register and a FIFO appropriate for the type of the FIS. The transport controller 110 manages the flow of a reception FIFO 122, and notifies the link controller 150 of necessary flow control. The transport controller 110 then notifies the link controller 150 and the upper-level layer (application layer) of the reception result.

The link controller 150 performs control of the link layer. Specifically, the link controller 150 performs the following process during transmission.

The link controller 150 receives data (FIS) from the transport controller 110. The link controller 150 generates a CRC for the FIS, and adds the CRC to the end of the FIS. The link controller 150 then scrambles the data, and performs 8b/10b encoding. The link controller 150 transmits the primitives and the FIS according to the SATA communication protocol. The link controller 150 notifies the transport controller 110 of the transmission result.

The link controller 150 performs the following process during reception. Specifically, the link controller 150 receives an 8b/10b-encoded character from the physical layer circuit 200. The link controller 150 decodes the 8b/10b-encoded character, and notifies the processing section and the like of the decoded primitives. The link controller 150 then descrambles the decoded FIS, and checks the CRC. The link controller 150 transfers the data to the transport controller 110. The link controller 150 notifies the transport controller 110 of the decoding result and the CRC check result.

The physical layer circuit 200 is an analog front-end circuit which implements the physical layer. The physical layer circuit 200 transmits and receives serial data (serial stream), converts the serial data into parallel data, and converts the parallel data into serial data. The physical layer circuit 200 detects an 8b/10b K28.5 character, and detects and transmits an out-of-band (OOB) signal. The physical layer circuit 200 provides a device status (presence or absence, transfer state, and power state of the device), and provides a communication control interface (transfer rate control and loop back). The physical layer circuit 200 optionally performs power management.

The physical layer circuit (PHY) 200 includes a transmitter (driver) 210, a receiver 220, an OOB detection circuit 230, and the like.

The transmitter 210 transmits serial data (packet) through differential signal lines (differential signal line pair) TX+/−, and the receiver 220 receives serial data (packet) through differential signal lines (differential signal line pair) RX+/−. A serial stream is transferred through the SATA bus (serial bus in a broad sense) of the differential signal lines TX+/− and RX+/− using NRZ differential signals having an amplitude voltage of +/−250 mV.

The OOB detection circuit 230 detects the OOB signal. The OOB signal is a signal which controls reset/initialization of the SATA interface, establishment of communication, and speed negotiation.

The link controller 150 includes a link state control circuit 160, a frame generation circuit 190, and a frame decoder circuit 192.

The link state control circuit 160 controls the state of the link controller 150. For example, the link state control circuit 160 performs a transition process between states such as a reset state, an idle state, a transmission state, and a reception state, for example.

The frame generation circuit 190 generates a frame based on transmission data (FIS) from the transport controller 110, a transmission control signal from the link state control circuit 160, and the like. Specifically, the frame generation circuit 190 calculates the CRC of the FIS from the transport controller 110, and performs the scrambling process, the 8b/10b encoding process, the process of generating and adding the primitives, and the like.

The frame decoder circuit 192 analyzes (deassembles) the received frame, and outputs a reception analysis signal (e.g., power-down request signal) to the link state control circuit 160. Specifically, the frame decoder circuit 192 analyzes the primitives added to the FIS, and performs the 8b/10b decoding process, the descrambling process, the process of calculating and checking the CRC, and the like.

The transport controller 110 includes an interrupt controller 118, a DMA control circuit 119, a transmission FIFO 120, a reception FIFO 122, an FIS generation circuit 130, an FIS decoder circuit 132, and a transport state control circuit 140.

The interrupt controller 118 generates an interrupt signal for indicating the received FIS information from the device 4 and the like. The DMA control circuit 119 controls DMA transfer of transmission data and reception data (contents and data) contained in the FIS. The transmission FIFO 120 is a FIFO which serves as a buffer for the transmission data from the DMA control circuit 119. The reception FIFO 122 is a FIFO which serves as a buffer for the reception data from the link controller 150. The FIS generation circuit 130 is a circuit which generates the FIS. The FIS decoder circuit 132 is a circuit which analyzes the FIS. The transport state control circuit 140 controls the state of the transport controller 110.

9. Sequence Controller

Figure 24:
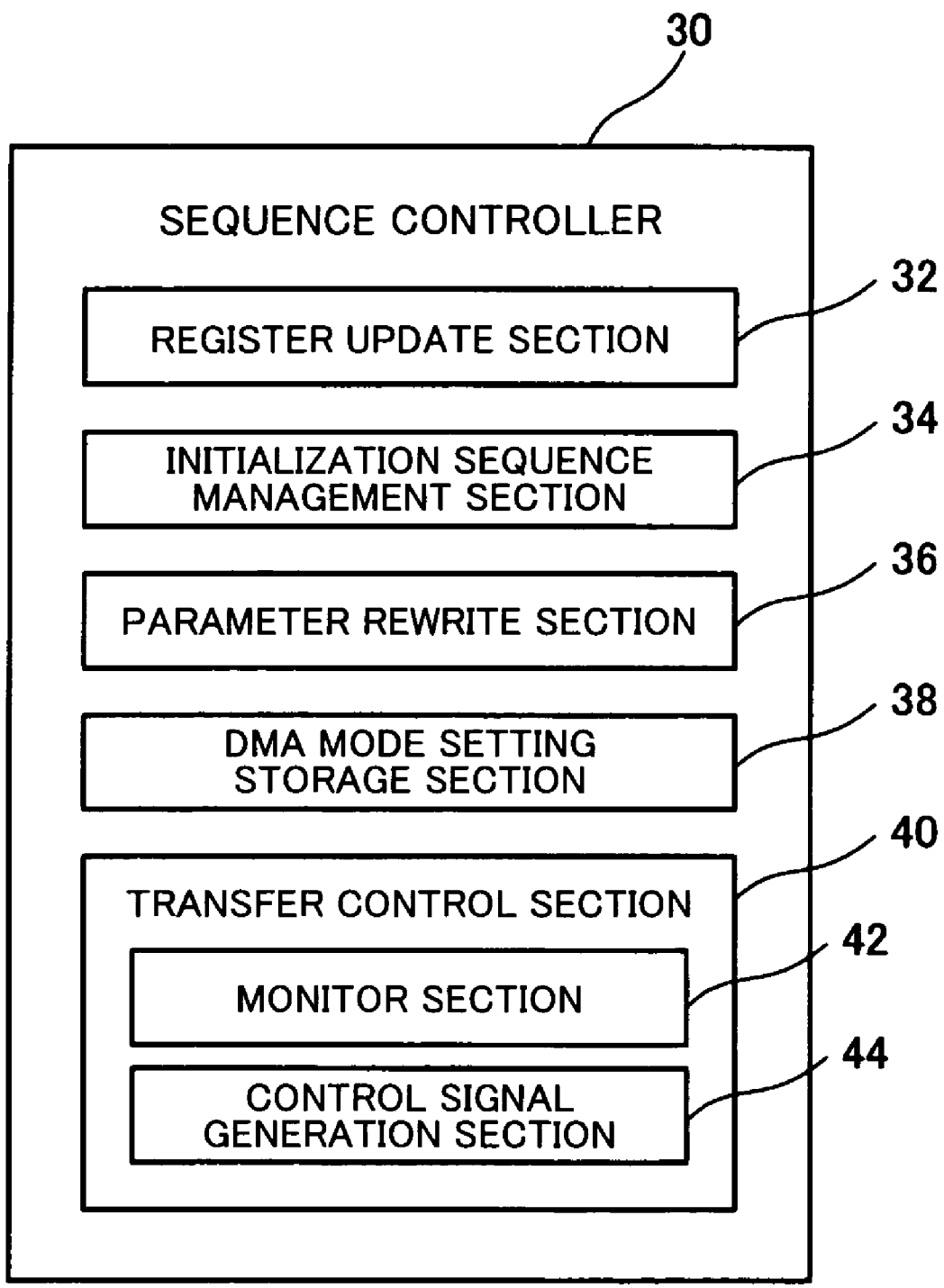
FIG. 24 shows a configuration example of a sequence controller.

FIG. 24 shows a configuration example of the sequence controller 30. The sequence controller 30 includes a register update section 32, an initialization sequence management section 34, a parameter rewriting section 36, a DMA mode setting storage section 38, and a transfer control section 40. The configuration of the sequence controller 30 is not limited to the configuration shown in FIG. 24. Various modification may be made such as omitting some elements or adding other elements.

The register update section 32 updates the register values of the TFR 12 (task file register) and the SFR 52 (shadow task file register). Specifically, the register update section 32 transfers the register value of the TFR 12 to the SFR 52 to update the register value of the SFR 52, or transfers the register value of the SFR 52 to the TFR 12 to update the register value of the TFR 12.

For example, when the host 2 has written an ATA command into the TFR 12, the PATA I/F 10 activates the command write detection signal. When the command write detection signal has become active, the register update section 32 transfers the register value of the TFR 12 to the SFR 52.

The SATA I/F 50 decodes the FIS received from the device 4, and generates and outputs an interrupt signal (received FIS information in a broad sense) which indicates the type of the FIS based on the decoding result. The register update section 32 determines the type of the received FIS based on the interrupt signal, and transfers the register value from the SFR 52 to the TFR 12 to update the register value, for example.

The initialization sequence management section 34 manages an initialization sequence accompanying a hardware reset (HRST) and a soft reset (SRST). Specifically, the initialization sequence management section 34 monitors a setting such as a master or a slave to manage the PATA initialization sequence.

The parameter rewriting section 36 rewrites a parameter when the host 2 has issued an identify device command to the device 4 and the parameter rewriting section 36 has received a parameter of the device information from the device 4. Specifically, the parameter rewriting section 36 rewrites a parameter such as the transfer rate with a parameter which can be dealt with.

When the host 2 has issued a set feature command, the DMA mode setting storage section 38 analyzes the set feature command, and stores the DMA transfer mode setting.

The transfer control section 40 controls the data transfer sequence of the data transfer control device. The transfer control section 40 includes a monitoring section 42 and a control signal generation section 44. The monitoring section 42 monitors signals such as the command write detection signal from the PATA I/F 10 and the interrupt signal (received FIS information) from the SATA I/F 50. The control signal generation section 44 generates control signals such as the transfer direction setting signal, the transfer start signal, and the transfer stop signal based on the monitoring result, and controls the transfer sequence by outputting the control signals to the PATA I/F 10, the data buffer 70, and the SATA I/F 50. The control signal generation section 44 outputs only the transfer direction setting signal to the data buffer 70 without outputting the transfer start signal and the transfer stop signal.

10. Electronic Instrument

Figure 25:
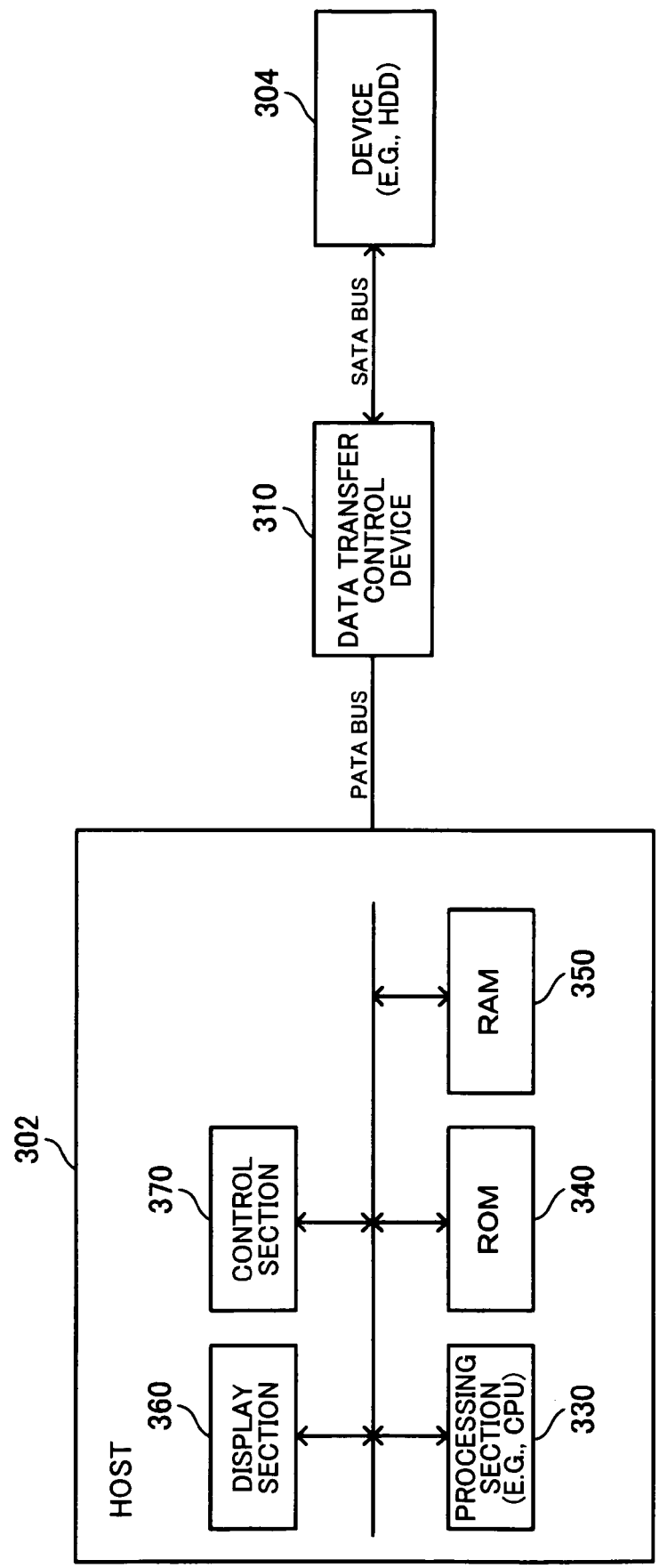
FIG. 25 shows a configuration example of an electronic instrument.

FIG. 25 shows a configuration example of an electronic instrument according to one embodiment of the invention.

The electronic instrument includes a data transfer control device 310, a host 302, and a device 304 described in the above embodiment. The host 302 and the data transfer control device 310 are connected through a PATA bus, and the data transfer control device 310 and the device 304 are connected through a SATA bus. The configuration of the electronic instrument according to this embodiment is not limited to the configuration shown in FIG. 25. Various modification may be made such as omitting some elements or adding other elements.

In FIG. 25, the device 304 is a storage device such as a hard disk drive (HDD), an optical disk (CD or DVD) drive or the like.

The host 302 may include a processing section 330 (CPU), a ROM 340, a RAM 350, a display section 360, and an operation section 370. The processing section 330 (CPU) controls the data transfer control device 310 and the entire electronic instrument. A processing section which controls the data transfer control device 310 and a processing section which controls the electronic instrument may be provided separately. The ROM 340 stores a control program and various types of data. The RAM 350 functions as a work area and a data storage area for the processing section 330 and the data transfer control device 310. The display section 360 displays various types of information to the user. The operation section 370 allows the user to operate the electronic instrument.

According to the electronic instrument according to this embodiment, even if the host 302 does not include a SATA I/F, the SATA device 304 can be connected to the host 302 through the data transfer control device 310 and operated as if the SATA device 304 were a PATA device.

As examples of the electronic instrument to which this embodiment may be applied, a car navigation system, a car audio instrument, an HDD recorder, a video camera, a portable music player, a portable image player, a game device, a portable game device, and the like can be given.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The configurations and the operations of the data transfer control device and the electronic instrument are not limited to those described in the above embodiments. Various modifications and variations may be made. The above embodiments have been described taking an example of applying the invention to the SATA standard. Note that the invention may also be applied to a standard based on the same idea as the SATA standard or a standard developed from the SATA (SATA I, SATA II, and SAS) standard.

What is claimed is:

1. A data transfer control device having a bus bridge function between a Parallel ATA and a Serial ATA, the data transfer control device comprising:
a Parallel ATA interface that is connected to a Parallel ATA bus and interfaces between the data transfer control device and a host;
a Serial ATA interface that is connected to a Serial ATA bus and interfaces between the data transfer control device and a Serial ATA device; and
a sequence controller that controls a transfer sequence, the Parallel ATA interface including a task file register; and
when the host has issued an ATA packet command, the sequence controller suspending transmission of a register FIS corresponding to the ATA packet command to the device, performing a dummy setting that causes the host to issue an ATAPI packet command corresponding to the ATA packet command using the task file register, and transmitting the register FIS corresponding to the ATA packet command to the device after the host has issued the ATAPI packet command, a command packet of the ATAPI packet command being set in a data register of the task file register.

2. The data transfer control device as defined in claim 1, the sequence controller causing the host to issue the ATAPI packet command corresponding to the ATA packet command by performing the dummy setting that clears a busy bit and sets a data request bit using the task file register.

3. The data transfer control device as defined in claim 1, the sequence controller performing a transfer sequence setting for data transfer through the Parallel ATA interface before performing the dummy setting using the task file register.

4. The data transfer control device as defined in claim 3, the data transfer control device further including a data buffer that buffers data transferred between the host and the device,
the sequence controller performing a transfer sequence setting for data transfer through the data buffer before performing the dummy setting using the task file register.

5. The data transfer control device as defined in claim 1, when the host has issued the ATAPI packet command, the sequence controller decoding the issued ATAPI packet command;
when the sequence controller has determined that the ATAPI packet command is a specific command based on a decoding result, the Parallel ATA interface and the Serial ATA interface performing DMA data transfer with the host and the device, respectively; and
when the sequence controller has determined that the ATAPI packet command is not the specific command based on the decoding result, the Parallel ATA interface performing DMA data transfer with the host, and the Serial ATA interface performing PIO data transfer with the device.

6. The data transfer control device as defined in claim 5, the data transfer control device further including a data buffer that buffers data transferred between the host and the device,
the sequence controller decoding the ATAPI packet command temporarily stored in the data buffer.

7. The data transfer control device as defined in claim 5, the Serial ATA interface including a shadow task file register; and
when the sequence controller has determined that the ATAPI packet command is not the specific command, the sequence controller rewriting the DMA bit by a PIO setting, and transferring a register value from the task file register to the shadow task file register, the DMA bit of the register value being rewritten by the PIO setting.

8. The data transfer control device as defined in claim 5, when the ATAPI packet command that is not the specific command has been issued, and the Serial ATA interface has transmitted a data FIS that includes the command packet to the device and received a PIO setup FIS from the device, the Parallel ATA interface performing DMA data transfer with the host, and the Serial ATA interface performing PIO data transfer with the device.

9. The data transfer control device as defined in claim 8, the sequence controller starting free-run transfer that does not manage a total data transfer count when the sequence controller has received the PIO setup FIS from the device that has received the data FIS.

10. The data transfer control device as defined in claim 9, the sequence controller performing sequence control of the free-run transfer by determining a transfer direction and a transfer type of data based on the received PIO setup FIS.

11. The data transfer control device as defined in claim 9, the sequence controller managing a transfer byte count of each PIO transfer during the free-run transfer based on a transfer count set in the PIO setup FIS received from the device.

12. The data transfer control device as defined in claim 9, the sequence controller finishing the free-run transfer when the sequence controller has received a register FIS from the device after the free-run transfer has started.

13. The data transfer control device as defined in claim 5, when the ATAPI packet command that is the specific command has been issued, and the Serial ATA interface has transmitted a data FIS that includes the command packet to the device and received a data FIS from the device, the Parallel ATA interface performing DMA read data transfer with the host, and the Serial ATA interface performing DMA read data transfer with the device.

14. The data transfer control device as defined in claim 5, when the ATAPI packet command that is the specific command has been issued, and the Serial ATA interface has transmitted a data FIS that includes the command packet to the device and received a DMA activate FIS from the device, the Parallel ATA interface performing DMA write data transfer with the host, and the Serial ATA interface performing DMA write data transfer with the device.

15. An electronic instrument comprising:
the data transfer control device as defined in claim 1;
the host that is connected to the data transfer control device; and
the device that is connected to the data transfer control device.

* * * * *